(12) United States Patent
Tang et al.

(10) Patent No.: US 11,166,278 B2
(45) Date of Patent: Nov. 2, 2021

(54) METHOD FOR INDICATING FREQUENCY DOMAIN RESOURCE, TERMINAL DEVICE AND NETWORK DEVICE

(71) Applicant: GUANGDONG OPPO MOBILE TELECOMMUNICATIONS CORP., LTD., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 198 days.

(21) Appl. No.: 16/453,216

(22) Filed: Jun. 26, 2019

(65) Prior Publication Data
US 2019/0320440 A1 Oct. 17, 2019

Related U.S. Application Data

(63) Continuation of application No. PCT/CN2016/112213, filed on Dec. 26, 2016.

(51) Int. Cl.
*H04W 72/04* (2009.01)
(52) U.S. Cl.
CPC ..... *H04W 72/0453* (2013.01); *H04W 72/042* (2013.01)
(58) Field of Classification Search
None
See application file for complete search history.

(56) References Cited

U.S. PATENT DOCUMENTS

2008/0014951 A1 1/2008 Laroia et al.
2009/0219856 A1 9/2009 Richardson et al.
(Continued)

FOREIGN PATENT DOCUMENTS

CN 101132608 A 2/2008
CN 101291512 A 10/2008
(Continued)

OTHER PUBLICATIONS

The second Office Action of corresponding Chinese application No. 201680091859.5, dated Sep. 3, 2019.
(Continued)

*Primary Examiner* — Diane L Lo

(57) ABSTRACT

Embodiments of the present application provide a method for indicating a frequency domain resource, a terminal device and a network device. The method includes: a terminal device receives first indication information sent by a network device, where the first indication information indicates, by using a first unit as granularity, whether a resource region in a system frequency domain resource includes a target frequency domain resource allocated by the network device from the system frequency domain resource to the terminal device; and the terminal device determines, according to the first indication information, a resource region where the target frequency domain resource is located. In the embodiments of the present application, the resource region including the target frequency domain resource is indicated by means of a hierarchical indication method, and signaling overheads can be saved, in particular, when a resource allocation amount is relatively small, signaling overheads are saved greatly.

7 Claims, 12 Drawing Sheets

(56) References Cited

U.S. PATENT DOCUMENTS

2012/0275422 A1* 11/2012 Kang ................. H04W 72/042
370/329
2016/0374114 A1   12/2016 Lu et al.
2018/0199341 A1*  7/2018 Baldemair ............ H04L 5/0091

FOREIGN PATENT DOCUMENTS

| | | |
|---|---|---|
| CN | 10998647 A | 3/2011 |
| CN | 102111878 A | 6/2011 |
| CN | 102204155 A | 9/2011 |
| CN | 102461294 A | 5/2012 |
| CN | 103634912 A | 3/2014 |
| CN | 106028454 A | 10/2016 |
| CN | 106130705 A | 11/2016 |
| EP | 2448348 A1 | 5/2012 |
| GB | 2464987 A | 5/2010 |
| WO | 2012129920 A1 | 10/2012 |

OTHER PUBLICATIONS

The First Office Action of corresponding Chilean application No. 201901775, dated Sep. 16, 2020.
The First Office Action of corresponding Indian application No. 201917028876, dated Nov. 6, 2020.
Extended European Search Report dated Nov. 22, 2019; Appln No. 16925703.7.
The First Office Action of corresponding Chinese application No. 201680091859.5, dated Jun. 10, 2020.
Panasonic, 3GPP TSG RAN WG1 Meeting #87 R1-1611894, Discussion on uplink control channel for NR, published on Nov. 18, 2016.
The first Office Action of corresponding Israeli application No. 267662, dated Mar. 21, 2021.

* cited by examiner

A terminal device receives first indication information sent by a network device, where the first indication information indicates, by using a first unit as granularity, whether a resource region in a system frequency domain resource includes a target frequency domain resource allocated by the network device from the system frequency domain resource to the terminal device, where, the system frequency domain resource includes multiple types of frequency domain resources, the multiple types of frequency domain resources respectively have different sub-carrier internals, the multiple types of frequency domain resources are respectively composed of minimum frequency domain scheduling units of different sizes, a size of the resource region is the same as a size of the first unit, the size of the first unit is M times a size of a minimum frequency domain scheduling unit of a frequency domain resource having a second sub-carrier interval, M is an integer greater than or equal to 1, and the second sub-carrier interval is greater than a sub-carrier interval of the target frequency domain resource ⸺310

The terminal device determines, according to the first indication information, a resource region where the target frequency domain resource is located ⸺320

FIG. 3

METHOD FOR INDICATING FREQUENCY DOMAIN RESOURCE, TERMINAL DEVICE AND NETWORK DEVICE

CROSS-REFERENCE TO RELATED APPLICATION

This application is a continuation of International Application No. PCT/CN2016/112213, filed on Dec. 26, 2016, the disclosure of which is hereby incorporated by reference in its entirety.

TECHNICAL FIELD

Embodiments of the present application relates to the field of communications and, in particular, to a method for indicating a frequency domain resource, a terminal device and a network device.

BACKGROUND

With the development of the mobile communication technology, in a fifth generation mobile communication technology (5G), a network device can dynamically allocate time frequency resources having different sub-carrier intervals to a terminal device. How to indicate the time frequency resources having different sub-carriers intervals allocated to the terminal device without causing significant control signaling overheads is a problem that needs to be solved.

SUMMARY

The embodiments of the present application provides a method for indicating a frequency domain resource, a terminal device and a network device, to implement indication of resources having multiple types of sub-carrier intervals, and to save signaling overheads.

In a first aspect, a method for indicating a frequency domain resource is provided, including: receiving, by a terminal device, first indication information sent by a network device, where the first indication information indicates, by using a first unit as granularity, whether a resource region in a system frequency domain resource includes a target frequency domain resource allocated by the network device from the system frequency domain resource to the terminal device, where the system frequency domain resource includes multiple types of frequency domain resources, the multiple types of frequency domain resources respectively have different sub-carrier internals, the multiple types of frequency domain resources are respectively composed of minimum frequency domain scheduling units of different sizes, a size of the resource region is the same as a size of the first unit, the size of the first unit is M times a size of a minimum frequency domain scheduling unit of a frequency domain resource having a second sub-carrier interval, M is an integer greater than or equal to 1, and the second sub-carrier interval is greater than a sub-carrier interval of the target frequency domain resource; and determining, by the terminal device, according to the first indication information, a resource region where the target frequency domain resource is located.

An indication unit used by the first indication information for indicating the region including the target frequency domain resource is greater than a minimum frequency domain scheduling unit of the target frequency domain resource, while a size of an indication unit used in the prior art for indicating the frequency domain resource is the same as the minimum frequency domain scheduling unit of the frequency domain resource. Therefore, compared with the prior art, the embodiment of the present application uses a greater indication unit to indicate the frequency domain resource, which can save a certain of signaling overheads.

With reference to the first aspect, in some implementations of the first aspect, the resource region includes the target frequency domain resource, the method further includes: receiving, by the terminal device, second indication information sent by the network device, where the second indication information indicates, by using a second unit as granularity, whether a frequency domain resource in each of sub-regions of the resource region belongs to the target frequency domain resource, a size of the sub-regions is the same as a size of the second unit, and the size of the second unit is the same as a size of a minimum frequency domain scheduling unit of the target frequency domain resource.

A rough indication by the first indication information can indicate the resource region where the target frequency domain resource is located on the system frequency domain resource, and a detailed indication by the second indication information can indicate whether the frequency domain resource in each of the sub-regions of the resource region belongs to the target frequency domain resource, so that the indication of the frequency domain resources having multiple types of sub-carrier intervals can be realized by means of a hierarchical indication method; and compared with the method in the prior art to indicate by directly using the minimum frequency domain scheduling unit of the frequency domain resource as granularity, a certain of signaling overheads can be saved, especially when the target frequency domain resource occupies a small proportion of the system frequency domain resource, more signaling overheads can be saved.

With reference to the first aspect, in some implementations of the first aspect, the first indication information and the second indication information are bitmap information.

The bitmap information can be configured to easily and flexibly perform the indication of the frequency domain resource. For example, 0 or 1 can directly indicate whether a certain resource region includes the target resource.

With reference to the first aspect, in some implementations of the first aspect, the resource region includes a plurality of sub-regions, the second indication information includes a plurality of bits, and each bit of the plurality of bits corresponds to one sub-region of the plurality of sub-regions, when a first bit in the second indication information is a first value, a frequency domain resource included in a sub-region corresponding to the first bit belongs to the target frequency domain resource, where the first bit is any one of the plurality of bits.

After the first indication information indicates the resource region including the target frequency domain resource by a greater frequency domain unit, the second indication information only needs to indicate the resource region including the target frequency domain resource in the system frequency domain resource by a smaller frequency domain unit, and then to perform "detailed indication", instead of performing the detailed indication on the target frequency domain resource in the entire system resource by a smaller frequency domain unit, like the prior art, which can save signaling overheads, and signaling overheads may be saved more obviously compared with the prior art when the target frequency domain resource only occupies a small proportion of the system frequency domain resource.

With reference to the first aspect, in some implementations of the first aspect, the target frequency domain resource includes a first frequency domain resource and a second frequency domain resource, and a sub-carrier interval of the first frequency domain resource is smaller than a sub-carrier interval of the second frequency domain resource, the first indication information is configured to indicate, by the first unit, whether the resource region in the system frequency domain resource includes the first frequency domain resource and the second frequency domain resource, and the second sub-carrier interval is greater than or equal to the sub-carrier interval of the second frequency domain resource.

When the target frequency domain resource includes two types of frequency domain resources, the first indication information can simultaneously indicate a region including the two types of frequency domain resources, and a joint indication of the two types of frequency domain resources is realized. Similarly, when the target frequency domain resource further includes other types of frequency domain resources other than the first frequency domain resource and the second frequency domain resource, the first indication information can implement a joint indication of multiple types of frequency domain resources in the target frequency domain resource.

With reference to the first aspect, in some implementations of the first aspect, the resource region includes the first frequency domain resource or the second frequency domain resource, and the method further includes: receiving, by the terminal device, second indication information sent by the network device, where the second indication information indicates, by using a second unit as granularity, whether a frequency domain resource in each of sub-regions of the resource region belongs to the first frequency domain resource or the second frequency domain resource, a size of the sub-regions is the same as a size of the second unit, and the size of the second unit is the same as a size of a minimum frequency domain scheduling unit of the first frequency domain resource.

With reference to the first aspect, in some implementations of the first aspect, the first indication information and the second indication information are bitmap information.

With reference to the first aspect, in some implementations of the first aspect, when all bits in the second indication information are of a second value, frequency domain resources in all the sub-regions of the resource region belong to the second frequency domain resource; when not all the bits in the second indication information are of the second value, a frequency domain resource in at least one sub-region of the resource region belongs to the first frequency domain resource.

Different values of the bits of the second indication information can indicate that the frequency domain resource in the sub-regions of the resource region specifically belong to the first frequency domain resource or the second frequency domain resource, and can accurately indicate these two types of frequency domain resources to the terminal device in the system frequency domain resource.

With reference to the first aspect, in some implementations of the first aspect, the second value is 0.

With reference to the first aspect, in some implementations of the first aspect, the method further includes: receiving, by the terminal device, resource type information sent by the network device; and determining, by the terminal device, according to the resource type information, a type of a frequency domain resource included in the target frequency domain resource.

The resource type information can directly indicate which types of frequency domain resources are allocated to the terminal device, so that the terminal device can quickly determine, according to the resource type information, the type of the resources included in the target frequency domain resource.

In a second aspect, a method for indicating a frequency domain resource is provided, including: receiving, by a terminal device, resource location indication information sent by a network device; receiving, by the terminal device, resource type indication information sent by the terminal device; determining, by the terminal device, according to the resource location indication information, a location of a target frequency domain resource in a system frequency domain resource, where the target frequency domain resource is a frequency domain resource allocated by the network device from multiple types of frequency domain resources to the terminal device, and different types of frequency domain resources have different sub-carrier intervals; and determining, by the terminal device, according to the resource type indication information, a type of a frequency domain resource included in the target frequency domain resource.

The network device can indicate the resource type of the frequency domain resource allocated to the terminal device by the resource type indication information, which can implement the indication of frequency domain resources having multiple types of sub-carrier intervals.

With reference to the second aspect, in some implementations of the second aspect, the target frequency domain resource includes M types of frequency domain resources, the resource location indication information includes M location indication information, and the M location indication information sequentially indicates a location of the M types of frequency domain resources in the system frequency domain resource, the resource type indication information includes M type indication information, the M type indication information sequentially indicates resource types of the M frequency domain resources, where M is an integer greater than or equal to 1.

When the target frequency domain resource includes multiple types of frequency domain resources, it is conveniently to indicate the type and location of the frequency domain resources included in the target frequency domain resource by a plurality of location indication information and a plurality of type indication information.

In a third aspect, a method for indicating a frequency domain resource is provided, including: generating, by a network device, first indication information, where the first indication information indicates, by using a first unit as granularity, whether a resource region in a system frequency domain resource includes a target frequency domain resource allocated by the network device from the system frequency domain resource to a terminal device, where, the system frequency domain resource includes multiple types of frequency domain resources, the multiple types of frequency domain resources respectively have different sub-carrier internals, the multiple types of frequency domain resources are respectively composed of minimum frequency domain scheduling units of different sizes, a size of the resource region is the same as a size of the first unit, the size of the first unit is M times a size of a minimum frequency domain scheduling unit of a frequency domain resource having a second sub-carrier interval, M is an integer greater than or equal to 1, and the second sub-carrier interval is greater than a sub-carrier interval of the target frequency domain resource; and sending, by the network device, the first indication information to the terminal device.

An indication unit used by the first indication information for indicating the region including the target frequency domain resource is greater than a minimum frequency domain scheduling unit of the target frequency domain resource, while a size of an indication unit used in the prior art for indicating the frequency domain resource is the same as the minimum frequency domain scheduling unit of the frequency domain resource. Therefore, compared with the prior art, the embodiment of the present application uses a greater indication unit to indicate the frequency domain resource, which can save a certain of signaling overheads.

With reference to the third aspect, in some implementations of the third aspect, the resource region includes the target frequency domain resource, and the method further includes: sending, by the network device, second indication information to the terminal device, where the second indication information indicates, by using a second unit as granularity, whether a frequency domain resource in each of sub-regions of the resource region belongs to the target frequency domain resource, a size of the sub-regions is the same as a size of the second unit, and the size of the second unit is the same as a size of a minimum frequency domain scheduling unit of the target frequency domain resource.

With reference to the third aspect, in some implementations of the third aspect, the first indication information and the second indication information are bitmap information.

With reference to the third aspect, in some implementations of the third aspect, the resource region includes a plurality of sub-regions, and the second indication information includes a plurality of bits, each bit of the plurality of bits corresponds to one sub-region of the plurality of sub-regions, when a first bit in the second indication information is a first value, a frequency domain resource included in a sub-region corresponding to the first bit belongs to the target frequency domain resource, where the first bit is any one of the plurality of bits.

With reference to the third aspect, in some implementations of the third aspect, the target frequency domain resource includes a first frequency domain resource and a second frequency domain resource, and a sub-carrier interval of the first frequency domain resource is smaller than a sub-carrier interval of the second frequency domain resource, the first indication information is configured to indicate, by the first unit, whether the resource region in the system frequency domain resource includes the first frequency domain resource and the second frequency domain resource, and the second sub-carrier interval is greater than or equal to the sub-carrier interval of the second frequency domain resource.

With reference to the third aspect, in some implementations of the third aspect, the resource region includes the first frequency domain resource or the second frequency domain resource, and the method further includes: sending, by the network device, second indication information to the terminal device, where the second indication information indicates, by using a second unit as granularity, whether a frequency domain resource in each of sub-regions of the resource region belongs to the first frequency domain resource or the second frequency domain resource, a size of the sub-regions is the same as a size of the second unit, and the size of the second unit is the same as a size of a minimum frequency domain scheduling unit of the first frequency domain resource.

With reference to the third aspect, in some implementations of the third aspect, the first indication information and the second indication information are bitmap information.

With reference to the third aspect, in some implementations of the third aspect, when all bits in the second indication information are of a second value, frequency domain resources in all the sub-regions of the resource region belong to the second frequency domain resource; when not all the bits in the second indication information are of the second value, the frequency domain resource in at least one sub-region of the resource region belongs to the first frequency domain resource.

With reference to the third aspect, in some implementations of the third aspect, the second value is 0.

With reference to the third aspect, in some implementations of the third aspect, the method further includes: sending, by the network device, resource type information to the terminal device, where the resource type information is configured to indicate a type of a frequency domain resource included in the target frequency domain resource.

In a fourth aspect, a method for indicating a frequency domain resource is provided, including: allocating, by a network device, a target frequency domain resource from multiple types of frequency domain resources to a terminal device, where different types of frequency domain resources have different sub-carrier intervals; sending, by the network device, resource location indication information to the terminal device, where the resource location indication information is configured to indicate a location of the target frequency domain resource in a system frequency domain resource; and sending, by the network device, resource type indication information to the terminal device, where the resource type indication information is configured to indicate a type of a frequency domain resource that is included in the target frequency domain resource.

The network device can indicate the resource type of the frequency domain resource allocated to the terminal device by the resource type indication information, which can implement the indication of frequency domain resources having multiple types of sub-carrier intervals.

With reference to the fourth aspect, in some implementations of the fourth aspect, the target frequency domain resource includes M types of frequency domain resources, the resource location indication information includes M location indication information, and the M location indication information sequentially indicates a location of the M types of frequency domain resources in the system frequency domain resource, the resource type indication information includes M type indication information, the M type indication information sequentially indicates resource types of the M frequency domain resources, where M is an integer greater than or equal to 1.

In a fifth aspect, a terminal device is provided, including modules for performing methods according to the first aspect or various implementations of the first aspect as such.

In a sixth aspect, a terminal device is provided, including modules for performing methods according to the second aspect or various implementations of the second aspect as such.

In a seventh aspect, a network device is provided, including modules for performing methods according to the third aspect or various implementations of the third aspect as such.

In an eighth aspect, a network device is provided, including modules for performing methods according to the fourth aspect or various implementations of the fourth aspect as such.

In a ninth aspect, a computer readable medium is provided, the computer readable medium stores a program code executed by a terminal device, and the program code includes instructions for performing methods according to the first aspect or various implementations of the first aspect as such.

In a tenth aspect, a computer readable medium is provided, the computer readable medium stores a program code executed by a network device, and the program code includes instructions for performing methods according to the second aspect or various implementations of the second aspect as such.

In an eleventh aspect, a computer readable medium is provided, the computer readable medium stores a program code executed by a terminal device, and the program code includes instructions for performing methods according to the third aspect or various implementations of the third aspect as such.

In a twelfth aspect, a computer readable medium is provided, the computer readable medium stores a program code executed by a network device, and the program code includes instructions for performing methods according to the fourth aspect or various implementations of the fourth aspect as such.

In a thirteenth aspect, a system chip is provided, including an input interface, an output interface, a processor and a memory, the processor is configured to execute a code in the memory, and when the code is executed, the processor can implement methods according to the foregoing first aspect and various implementations.

In a fourteenth aspect, a system chip is provided, including an input interface, an output interface, a processor and a memory, the processor is configured to execute a code in the memory, and when the code is executed, the processor can implement methods according to the foregoing second aspect and various implementations.

In a fifteenth aspect, a system chip is provided, including an input interface, an output interface, a processor and a memory, the processor is configured to execute a code in the memory, and when the code is executed, the processor can implement methods according to the foregoing third aspect and various implementations.

In a sixteenth aspect, a system chip is provided, including an input interface, an output interface, a processor and a memory, the processor is configured to execute a code in the memory, and when the code is executed, the processor can implement methods according to the foregoing fourth aspect and various implementations.

BRIEF DESCRIPTION OF THE DRAWINGS

FIG. 3 is a schematic flowchart of a method for indicating a frequency domain resource according to an embodiment of the present application;

DESCRIPTION OF EMBODIMENTS

The technical solution in the embodiment of the present application will be described below with reference to the appended drawings in the embodiment of the present application.

The technical solution of the embodiment of the present application can be applied to various communication systems, for example, a Global System of Mobile communication (GSM) system, Code Division Multiple Access (CDMA) system, s Wideband Code Division Multiple Access (WCDMA) system, the General Packet Radio Service (GPRS), a Long Term Evolution (LTE) system, a Frequency Division Duplex (FDD) system, LTE Time Division Duplex (TDD), a Universal Mobile Telecommunication System (UMTS), a Worldwide Interoperability for Microwave Access (WiMAX) communication system, or a future 5G system.

Figure 1:
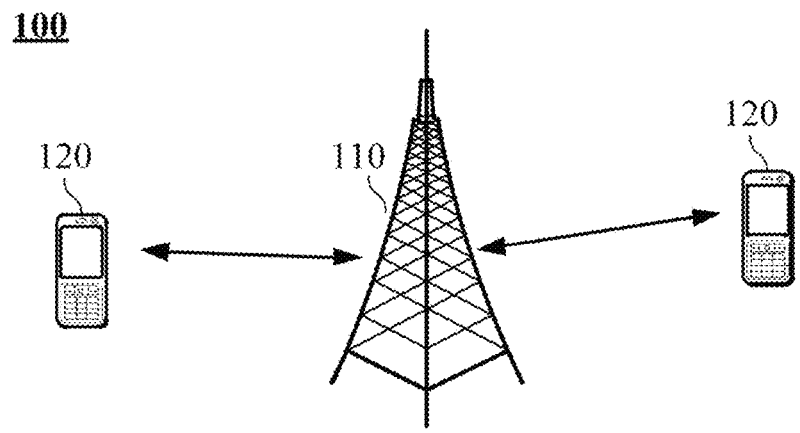
FIG. 1 is a schematic diagram of a communication system according to an embodiment of the present application.

FIG. 1 shows a wireless communication system 100 applied to the embodiment of the present application. The wireless communication system 100 may include a network device 110 and a terminal device 120. The network device can allocate time frequency resources to the terminal device 120 to utilize the resources for data transmission. The network device 100 may be a device that communicates with a terminal device, and the network device 100 may provide communication coverage for a particular geographic area and may communicate with a terminal device (e.g., UE) located within the coverage area. In an embodiment, the network device 100 may be a Base Transceiver Station (BTS) in a GSM system or a CDMA system, a NodeB (NB) in a WCDMA system, an Evolutional Node B (eNB or eNodeB) in a LTE system, or a wireless controller in a Cloud Radio Access Network (CRAN). Alternatively, the network device may be a relay station, an access point, a vehicle-mounted device, a wearable device, a network-side device in the future 5G network or a network device in the future evolving Public Land Mobile Network (PLMN), etc.

The wireless communication system 100 also includes at least one terminal device 120 located within the coverage area of the network device 110. The terminal device 120 may be mobile or stationary. In an embodiment, the terminal device 120 can be an access terminal, user equipment (UE), a subscriber unit, a subscriber station, a mobile station, a mobile, a remote station, a remote terminal, a mobile device, a user terminal, a terminal, a wireless communication device, a user agent or a user device. The access terminal can be a cellular phone, a cordless phone, a Session Initiation Protocol (SIP) telephone, a wireless local loop (WLL) station, a personal digital assistant (PDA), a handheld device having wireless communication capability, a computing device or other processing device connected to a wireless modem, a vehicle-mounted device, a wearable wireless device, a terminal device in future 5G network or a terminal device in future evolving PLMN, etc.

In an embodiment, a 5G system or network can also be called a New Radio (NR) system or network.

FIG. 1 only exemplarily shows a communication system including one network device and two terminal devices. In an embodiment, the wireless communication system 100 may include multiple types of network devices, and the coverage area of each network device may include other numbers of terminal devices therein, which will not be limited by the embodiment of the present application.

In an embodiment, the wireless communication system 100 may further include other network entities, such as a network controller and a mobility management entity, which will not be limited by the embodiment of the present application.

It should be understood that terms "system" and "network" are used interchangeably herein. The term "and/or" used herein is merely an association describing the associated objects, indicating that there may be three relationships, for example, A and/or B may indicate three situations: A exists separately; A and B exist simultaneously; B exists separately. In addition, the character "/" used herein generally indicates that the contextual associated objects are of the "or" relationship.

In the prior art, when a network device allocates frequency domain resources having multiple types of different sub-carrier intervals to a terminal device, the network device indicates, utilizing the multiple types of different indication information, frequency domain resources having different sub-carrier intervals respectively by different granularities. For example, the network device allocates a first frequency domain resource, a second frequency domain resource, and a third frequency domain resource to the terminal device, where the sub-carrier interval of the first frequency domain resource is f1, and the size of a resource block that constitutes the first frequency domain resource is R1; the sub-carrier interval of the second frequency domain resource is f2, and the size of a resource block that constitutes the second frequency domain resource is R2; the sub-carrier interval of the third frequency domain resource is f3, and the size of a resource block that constitutes the third frequency domain resource is R3, where f1>f2>f3, and R1>R2>R3. The network device respectively uses three fields to indicate these three frequency domain resources, where the three fields, using R1, R2 and R3 as granularities, respectively indicate locations of the first frequency domain resource, the second frequency domain resource and the third frequency domain resource on a system frequency domain resource. Since R1>R2>R3, the field, from the first field to the third field, occupies more and more bits. The existing resource indication method will be described in detail below with reference to FIG. 2.

Figure 2:
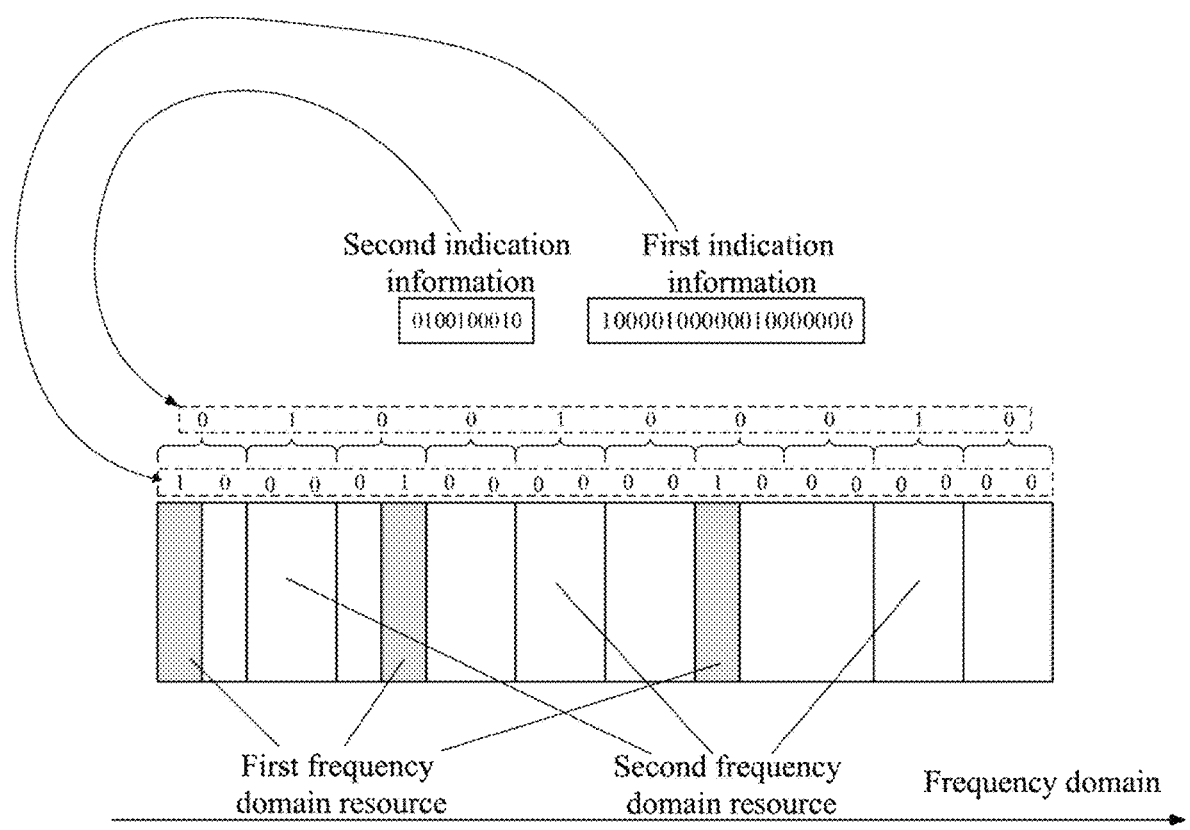
FIG. 2 is a schematic diagram of a method for indicating a frequency domain resource in the prior art.

FIG. 2 is a schematic diagram showing a resource indication method in the prior art respectively indicating frequency domain resources having two different sub-carrier intervals. FIG. 2 shows the distribution of both the first frequency domain resource and the second frequency domain resource in the entire system frequency domain resource, where the sub-carrier interval of the first frequency domain resource and the sub-carrier interval of the second frequency domain resource are respectively f1 and f2, and the first frequency domain resource and the second frequency domain resource are respectively composed of resource blocks of size f1 and size f2, and f1=f2, R2=2R1. In FIG. 2, the network device divides the system frequency domain resource into multiple types of resource regions by R1 and R2, respectively, where each resource region uses bit 0 or 1 to indicate whether a corresponding resource exists in the resource region.

When a network device allocates a second frequency domain resource to a terminal device, the second indication information including the field (0100100010) may be sent to the terminal device to indicate the location of the second frequency domain resource in the entire system frequency domain resource, where the frequency domain resource in a resource region with the bit value of 1 belongs to the second frequency domain resource, and the frequency domain resource in a resource region with the bit value of 0 does not belong to the second frequency domain resource.

When a network device allocates a first frequency domain resource to a terminal device, the first indication information including the field (10000100000010000000) may be transmitted to the terminal device to indicate the location of the first frequency domain resource in the entire system frequency domain resource, where the frequency domain resource in a resource region with the bit value of 1 belongs to the first frequency domain resource, and the frequency domain resource in a resource region with the bit value of 0 does not belong to the first frequency domain resource (the frequency domain resource of the resource region may be a reserved frequency domain resource or a frequency domain resource that has been allocated).

Sizes of the resource regions that are divided by the network device when indicating the two frequency domain resources are different, and the size of the resource region that is divided when indicating the first frequency domain resource is the same as that of the minimum frequency domain scheduling unit of the first frequency domain resource, and the size of the resource region that is divided when indicating the second frequency domain resource is the same as that of the minimum frequency domain scheduling unit of the second frequency domain resource. Since R2 is smaller than R1, the bit occupied by the field of the second indication information is much greater than the bit occupied by the field of the first indication information, and more fields are needed to be configured to indicate frequency domain resources when resource blocks constituting the frequency domain resource become smaller, which will cause significant signaling overheads.

In addition, in FIG. 2, if a network device allocates both a first frequency domain resource and a second frequency domain resource to a terminal device at the same time, the network device may transmit first indication information and second indication information to the terminal device simultaneously or sequentially, so as to indicate the location of these two frequency domain resources in a system frequency domain resource.

It should be understood that the system frequency domain resource is set very small in FIG. 2 for convenience of description. In fact, the frequency domain resource allocated by the network device to the terminal device only occupies a small part of the entire system frequency domain resource, that is, in most resource regions, the frequency domain resource allocated by the network device to the terminal device is not included. Therefore, when the frequency domain resource is indicated using the method shown in FIG. 2, indication information will include a large number of fields with bits of 0, which may cause significant signaling overheads.

To this end, the embodiment of the present application proposes a new method for indicating frequency domain resource: when indicating a frequency domain resource, a target frequency domain resource is firstly "roughly indicated" using a unit with a greater granularity, and the target frequency domain resource is then "detailedly indicated" using a unit with a smaller granularity, so as to save signaling overheads when indicating the frequency domain resource. The method for indicating the frequency domain resource in the embodiment of the present application will be described in detail below with reference to FIG. 3 to FIG. 8.

FIG. 3 is a schematic flowchart of a method for indicating a frequency domain resource according to an embodiment of the present application. The method 300 of FIG. 3 includes:

310. A terminal device receives first indication information sent by a network device, where the first indication information indicates, by using a first unit as granularity, whether a resource region in a system frequency domain resource includes a target frequency domain resource allocated by the network device from the system frequency domain resource to the terminal device;

where the system frequency domain resource includes multiple types of frequency domain resources, the multiple types of frequency domain resources respectively have different sub-carrier internals, the multiple types of frequency domain resources are respectively composed of minimum frequency domain scheduling units of different sizes, a size of the resource region is the same as a size of the first unit, the size of the first unit is M times a minimum frequency domain scheduling unit of a frequency domain resource having a second sub-carrier interval, M is an integer greater than or equal to 1, and the second sub-carrier interval is greater than a sub-carrier interval of the target frequency domain resource; and 320. The terminal device determines, according to the first indication information, a resource region where the target frequency domain resource is located.

The above target frequency domain resource may be a frequency domain resource having one type of sub-carrier interval, or frequency domain resources having multiple types of sub-carrier intervals, that is, a network device may allocate a frequency domain resource having one type of sub-carrier interval to the terminal device, or allocate frequency domain resources having multiple types of sub-carrier intervals to the terminal device.

When the above target frequency domain resource includes frequency domain resources having multiple types of sub-carrier intervals, the first indication information indicates the resource region where the frequency domain resources having multiple types of sub-carrier intervals are located.

In the embodiment of the present application, a size of an indication unit used by the first indication information, that is, the size of the first unit, is greater than a size of a minimum frequency domain scheduling unit of the target frequency domain resource, and a size of an indication unit used for indicating the frequency domain resource in the prior art is the same as that of the minimum frequency domain scheduling unit of the frequency domain resource. Compared with the prior art, the embodiment of the present application uses a greater indication unit to indicate the frequency domain resource, thereby saving signaling overheads.

In an embodiment, when the above resource region includes the target frequency domain resource, and the method of FIG. 3 further includes:

a terminal device receives second indication information sent by the network device, where the second indication information indicates, by using a second unit as granularity, whether a frequency domain resource in each of sub-regions of the resource region belongs to the target frequency domain resource, a size of the sub-regions is the same as a size of the second unit, and the size of the second unit is the same as a size of a minimum frequency domain scheduling unit of the target frequency domain resource.

In the embodiment of the present application, a rough indication by the first indication information can indicate the resource region where the target frequency domain resource is located on the system frequency domain resource, and a detailed indication by the second indication information can indicate whether the frequency domain resource in each of the sub-regions of the resource region belongs to the target frequency domain resource, so that the location of the target frequency domain resource in the system frequency domain resource can be determined. Moreover, compared with the method in the prior art to indicate by directly using the minimum frequency domain scheduling unit of the frequency domain resource as granularity, a certain of signaling overheads can be saved.

In an embodiment, the above first indication information and second indication information may be bitmap information. Specifically, when a value of a bit of the above first indication information is 1, it indicates that the resource region includes the target frequency domain resource, while when the value of the bit of the first indication information is 0, it indicates that the resource region does not include the target frequency domain resources. Of course, other bit values may also be used to indicate whether the resource region includes the target frequency domain resource.

In an embodiment, when the above resource region includes the target frequency domain resource, the resource region may include a plurality of sub-regions, the above second indication information may include a plurality of bits, and each bit of the plurality of bits respectively corresponds to one sub-region of the plurality of sub-regions, when a first bit in the second indication information is a first value, a frequency domain resource included in a sub-region corresponding to the first bit belongs to the target frequency domain resource, where the first bit is any one of the plurality of bits. That is, each bit of the second indication information indicates whether a frequency domain resource in one region belongs to the target frequency domain resource.

For example, when the above resource region includes two sub-regions, the second indication information includes two bits in total. When a value of the two bits is 10, it indicates that only a frequency domain resource in a first sub-region belongs to the target frequency domain resource;

when the value of the two bits is 01, it indicates that only a frequency domain resource in a second sub-region belongs to the target frequency domain resource, when the value of the two bits is 11, it indicates that the frequency domain resources in both the first sub-region and the second sub-region belong to the target frequency domain resource.

In an embodiment, the above target frequency domain resource may be a first frequency domain resource, that is, the target frequency domain resource may include a frequency domain resource having only one type of sub-carrier interval.

Figure 4:
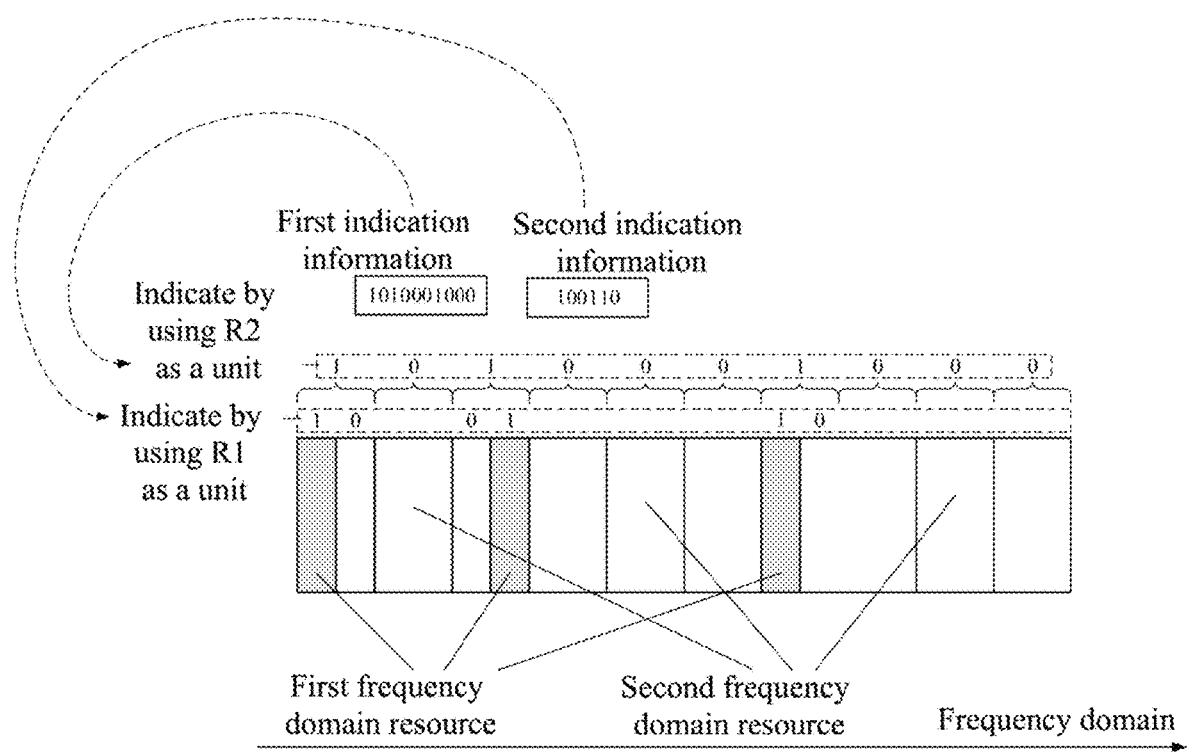
FIG. 4 is a schematic diagram of a method for indicating a frequency domain resource according to an embodiment of the present application.

The following uses FIG. 4 as an example to describe in detail how the network device indicates the first frequency domain resource by using the first indication information and the second indication information.

In FIG. 4, the entire system frequency domain resource includes the first frequency domain resource and a second frequency domain resource, where the first frequency domain resource is a frequency domain resource allocated by the network device to the terminal device. Sub-carrier intervals of the first frequency domain resource and the second frequency domain resource are f1 and f2, respectively, and minimum frequency domain resource units constituting the first frequency domain resource and the second frequency domain resource are R1 and R2, and f2=2f1, R2=2R1. The network device first indicates, by using the first indication information, a first region that includes the first frequency domain resource (a size of the first region is the same as that of R1), and the first region is a region corresponding to a bit of the first indication information, a value of which is 1. The first region where the first frequency domain resource is located is indicated by the first indication information, but not all the frequency domain resources in every sub-region of the first region necessarily belong to the first frequency domain resource, and a distribution of the first frequency domain resource in the first region is then specifically indicated by the second indication information. The first region corresponds to two bits of the second indication information, that is, the first region includes two sub-regions, and a size of each sub-region is the same as that of R2. When a value of the bits of the second indication information is 10, it indicates that only a frequency domain resource in a first sub-region belongs to the first frequency domain resource, when the value of the bits of the second indication information is 01, it indicates that only a frequency domain resource in a second sub-region belongs to the first frequency domain resource, when the value of the bits of the second indication information is 11, it indicates that the frequency domain resources in both the first sub-region and the second sub-region belong to the first frequency domain resource.

As can be seen from FIG. 4, the second indication information only needs to indicate in the first region including the first frequency domain resource indicated by the first indication information, that is, the second indication information only needs to indicate in a corresponding region with the first indication information of 1, and does not need to indicate in other resource regions. Therefore, compared with the existing method for indicating frequency domain resource, a large number of bits can be saved, thereby reducing signaling overheads.

Specifically, taking a case where the first frequency domain resource is also indicated in FIG. 2 and FIG. 4 as examples. In FIG. 2, a first indication information including a field of 10000100000010000000 (20 bits in total) needs to be sent, and in FIG. 4, only a first indication information including a field of 1010001000 (10 bits in total) and a second indication information including a field of 100110 (6 digits in total) need to be sent. In FIG. 2, the first indication information occupies a total of 20 bits, and in FIG. 4, the first indication information and the second indication information occupy a total of 16 bits. Therefore, compared with the resource indication manner in FIG. 2, the resource indication manner of FIG. 4 can save a certain of signaling overheads. If a further consideration is made that the first frequency domain resource only occupies a small portion of the entire system frequency domain resource, the bit occupied by the indication information in FIG. 4 will be much smaller than the bit occupied by the indication information in FIG. 2.

In an embodiment, when above target frequency domain resource includes a first frequency domain resource and a second frequency domain resource, and a sub-carrier interval of the first frequency domain resource is smaller than a sub-carrier interval of the second frequency domain resource, the first indication information is configured to indicate, by the first unit, whether the resource region in the system frequency domain resource includes the first frequency domain resource and the second frequency domain resource, and the second sub-carrier interval is greater than or equal to the sub-carrier interval of the second frequency domain resource.

It should be understood that when the target frequency domain resource includes only one type of frequency domain resource, the second sub-carrier interval may be greater than the sub-carrier interval of the target frequency domain resource; when the target frequency domain resource includes multiple types of frequency domain resources, the second sub-carrier interval may be greater than or equal to a sub-carrier interval of a type of frequency domain resource having a greater sub-carrier interval in the target frequency domain resource. Preferably, the second sub-carrier interval is greater than or equal to a sub-carrier interval of a frequency domain resource having the greatest sub-carrier interval in the target frequency domain resource.

In addition, the target frequency domain resource including the first frequency domain resource and the second frequency domain resource may indicate that the target frequency domain resource is composed of the two types of frequency domain resources, or may indicate that the target frequency domain resource also includes other types of frequency domain resources except these two types of frequency domain resources.

In an embodiment, when the above resource region includes the first frequency domain resource or the second frequency domain resource, and the method of FIG. 3 further includes: the terminal device receives second indication information sent by the network device, where the second indication information indicates, by using a second unit as granularity, whether a frequency domain resource in each of sub-regions of the resource region belongs to the first frequency domain resource or the second frequency domain resource, a size of the sub-regions is the same as a size of the second unit, and the size of the second unit is the same as a size of a minimum frequency domain scheduling unit of the first frequency domain resource.

After the resource region including the first frequency domain resource or the second frequency domain resource is indicated by the first indication information, it only needs to indicate the resource in each sub-region of the resource region belongs to the first frequency domain resource or the second frequency domain resource, without needing to indicate in a resource region that does not include the first frequency domain resource or the second frequency domain resource, which can save significant signaling overheads.

In an embodiment, the above first indication information and second indication information may specifically be bitmap information.

In an embodiment, when the above resource region includes the first frequency domain resource or the second frequency domain resource, and all bits in the second indication information are of a second value, frequency domain resources in all the sub-regions of the resource region belong to the second frequency domain resource; when not all the bits in the second indication information are of the second value, a frequency domain resource in at least one sub-region of the resource region belongs to the first frequency domain resource. In an embodiment, the above second value may be 0. Of course, the second value may also be other values.

Figure 5:
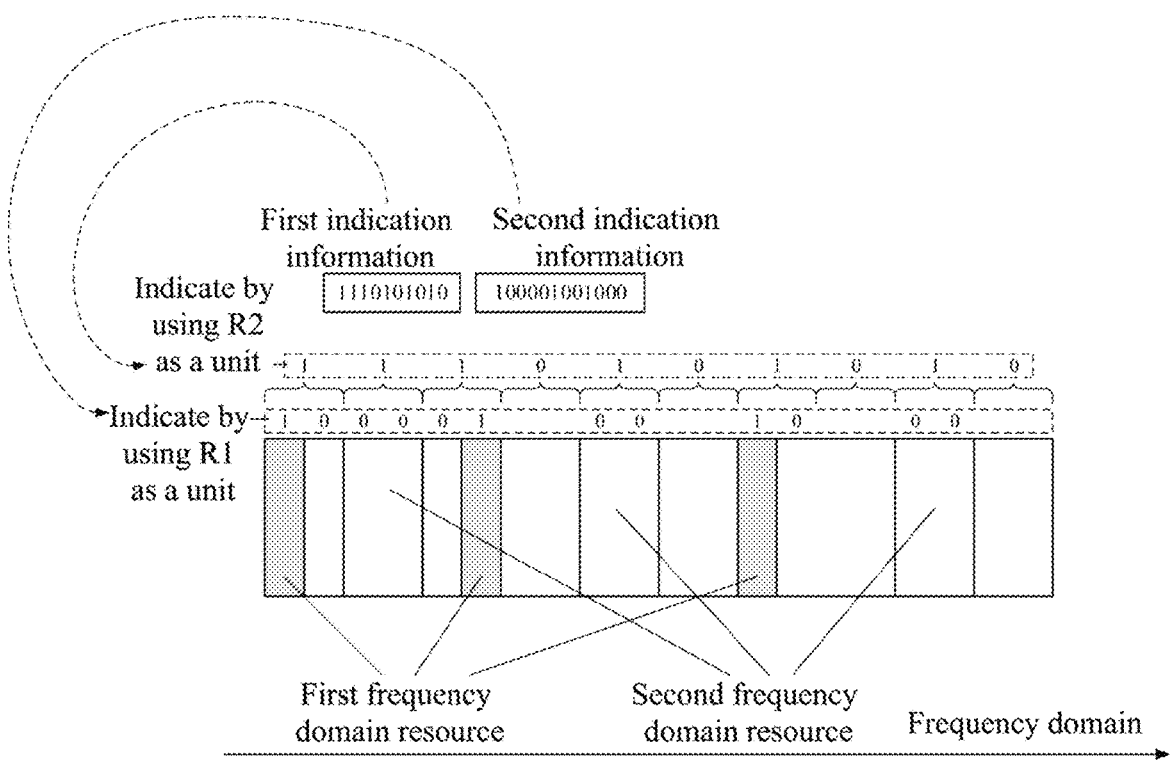
FIG. 5 is a schematic diagram of a method for indicating a frequency domain resource according to an embodiment of the present application.

FIG. 5 will be referred below to describe in detail a case where when the target resource is composed of the first frequency domain resource and the second frequency domain resource, how the first indication information and the second indication information indicate the first frequency domain resource and the second frequency domain resource.

As shown in FIG. 5, the network device allocates the first frequency domain resource and the second frequency domain resource to the terminal device at the same time, and sub-carrier intervals of the first frequency domain resource and the second frequency domain resource are f1 and f2, respectively; minimum frequency domain resource units constituting the first frequency domain resource and the second frequency domain resource are R1 and R2, and f2=2f1, R2=2R1. The network device indicates, by the first indication information, a resource region including the first frequency domain resource or the second frequency domain resource, and then specifically indicates, by the second indication information, a specific distribution of the first frequency domain resource or the second frequency domain resource in the resource region.

In FIG. 5, the network device first divides the system frequency domain resource into multiple resource regions, using R2 as a unit, and the bit value of the field of the first indication information is 1 as long as the resource region only includes the first frequency domain resource or the second frequency domain resource, and then indicates, by the second indication information, the distribution of the two types of resources in the resource region including the first frequency domain resource or the second frequency domain resource. Specifically, assuming that the second region (the second region is composed of two sub-regions) includes the first frequency domain resource or the second frequency domain resource, when the value of the bits in the second indication information is 10, it indicates that a frequency domain resource in the first sub-region belongs to the first frequency domain resource, when the value of the bits in the second indication information is 01, it indicates that a frequency domain resource in the second sub-region belongs to the first frequency domain resource, when the value of the bits in the second indication information is 11, it indicates that all the frequency domain resources in the two sub-regions belong to the first frequency domain resource, and when the value of the bits in the second indication information is 00, it indicates that all the frequency domain resources in the two sub-regions belong to the second frequency domain resource.

Taking a case where the first frequency domain resource and the second frequency domain resource are also indicated in FIG. 2 and FIG. 5 as examples. In FIG. 2, a second indication information including a field of 010010010 (10 bits in total) and a first indication information including a field of 10000100000010000000 (20 bits in total) need to be sent. In FIG. 5, a first indication information including a field of 1110101010 (10 bits in total) and a second indication information including a field of 100001001000 (20 bits in total) need to be sent. In FIG. 2, a field of 30 bits is required to indicate the first frequency domain resource and the second frequency domain resource, while in FIG. 5, only a field of 22 bits is required to indicate the first frequency domain resource and the second frequency domain resource. It can be seen that the method for indicating the frequency domain resource in the embodiment of the present application can save more signaling overheads, when multiple types of frequency domain resources having different sub-carrier intervals are simultaneously indicated.

Figure 6:
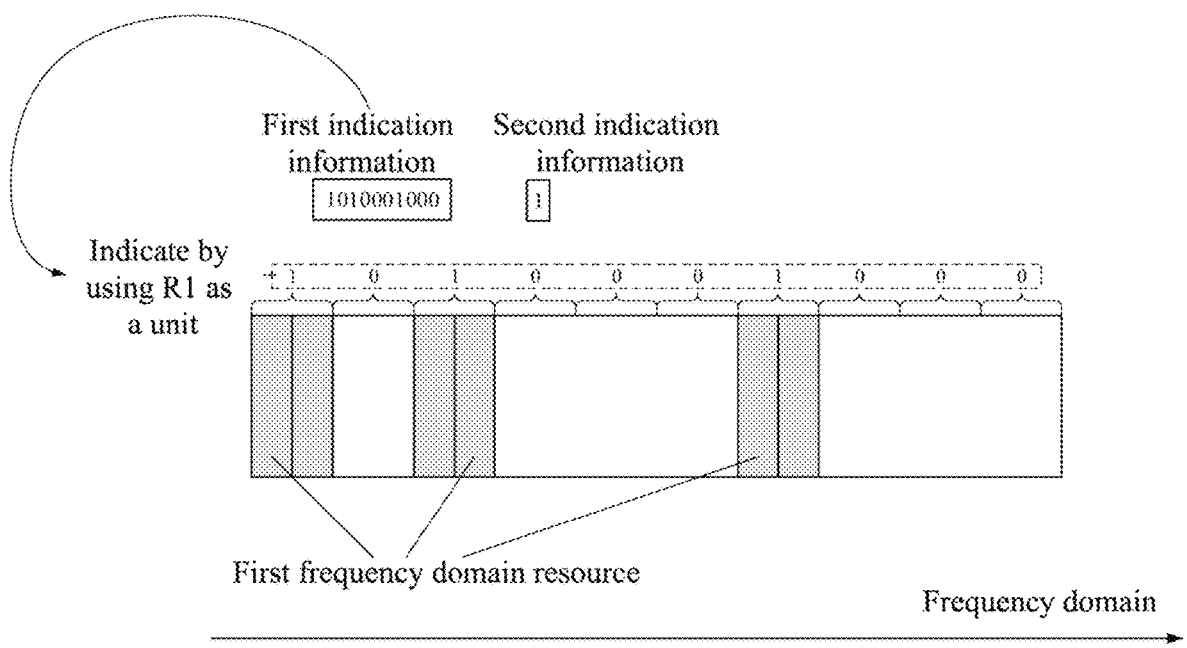
FIG. 6 is a schematic diagram of a method for indicating a frequency domain resource according to an embodiment of the present application.

As shown in FIG. 6, the network device allocates the first frequency domain resource to the terminal device, the minimum frequency domain scheduling unit of the first frequency domain resource is R1, and the network device divides, using the R2 (R2=2R1) as a basic unit, the entire system frequency domain resource into multiple resource regions, and indicates, using the R2 as granularity, the location where the first frequency domain resource is located in the system frequency domain resource. Since the first frequency domain resource is discretely distributed in the system resource by two consecutive resource blocks of R1 size, after a resource region including the first frequency domain resource is indicated by the first indication information, the second indication information only needs to adopt a bit with a value of 1 (or 0) to indicate that a frequency domain resource in the resource region that includes the first frequency domain resource belongs to the first frequency domain resource. Compared with the cases of FIG. 5 and FIG. 4, FIG. 6 can save more signaling overheads.

In an embodiment, the method of FIG. 3 may further include: the terminal device receives resource type information sent by the network device; and the terminal device determines, according to the resource type information, a type of a frequency domain resource included in the target frequency domain resource. For example, when the network device allocates the frequency domain resource having two types of sub-carrier intervals to the terminal device (the sub-carrier intervals are f1 and f2, respectively, and the minimum frequency domain scheduling units constituting the two types of frequency domain resources are R1 and R2), then the resource indication information may indicate that the sub-carrier intervals of the two types of frequency domain resources are f1 and f2, respectively, and may also indicate that the minimum frequency domain scheduling units of the two types of frequency domain resources are R1 and R2, respectively.

In an embodiment, when the target frequency domain resource includes multiple types of frequency domain resources, the above resource type information may be composed of multiple indication information, and each indication information is configured to indicate one frequency domain resource type. The resource type information may also be composed of only one piece of indication information, and then the indication information simultaneously indicates types of the multiple types of frequency domain resources included in the target frequency domain resource.

Figure 7:
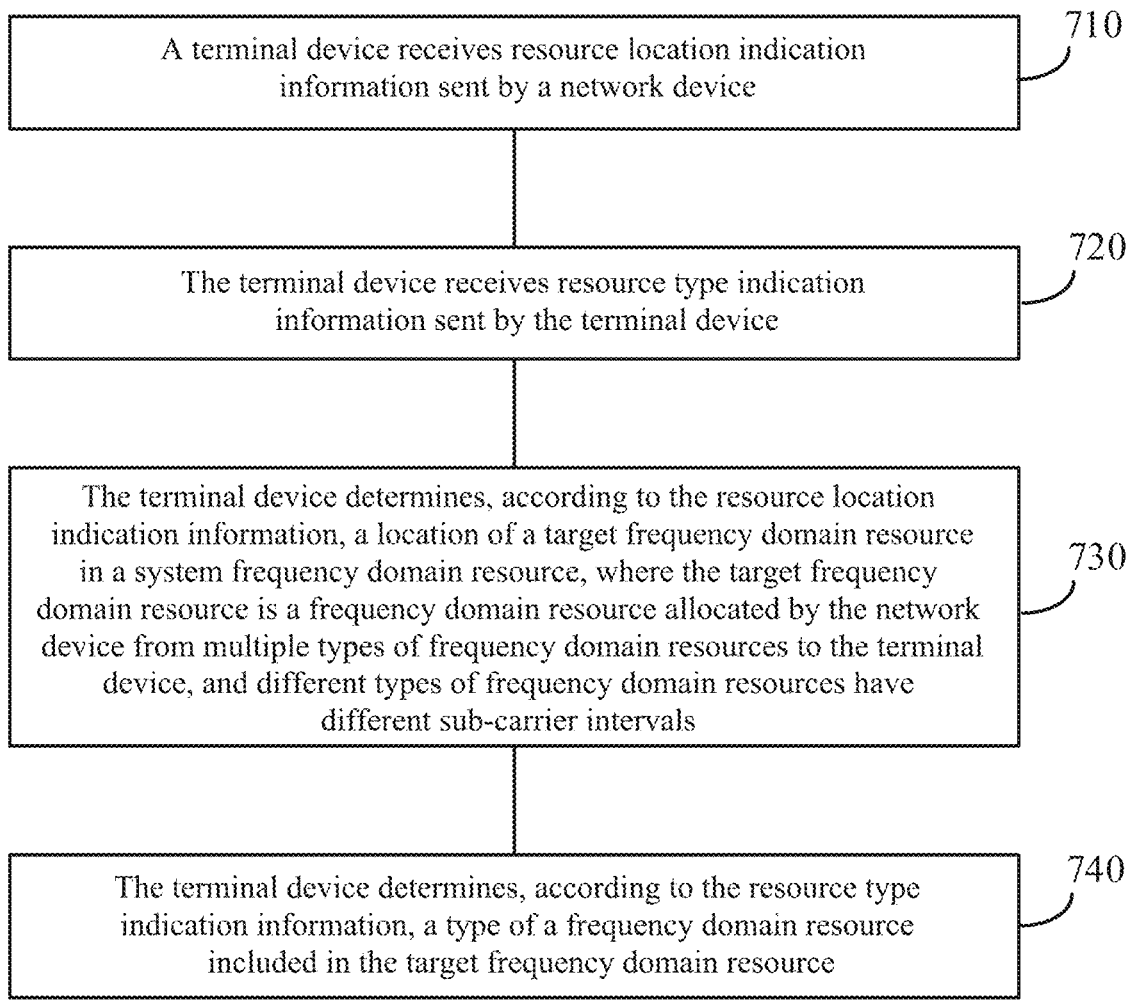
FIG. 7 is a schematic flowchart of a method for indicating a frequency domain resource according to an embodiment of the present application.

FIG. 7 is a schematic flowchart of a method for indicating a frequency domain resource according to an embodiment of the present application. The method of FIG. 7 includes:

710. A terminal device receives resource location indication information sent by a network device;

720. The terminal device receives resource type indication information sent by the terminal device;

730. The terminal device determines, according to the resource location indication information, a location of a target frequency domain resource in a system frequency domain resource, where the target frequency domain resource is a frequency domain resource allocated by the network device from multiple types of frequency domain resources to the terminal device, and different types of frequency domain resources have different sub-carrier intervals; and 740. The terminal device determines, according to the resource type indication information, a type of a frequency domain resource included in the target frequency domain resource.

In the embodiment of the present application, the network device can indicate the resource type of the frequency domain resource allocated to the terminal device by the resource type indication information, which can implement the indication of frequency domain resources having multiple types of sub-carrier intervals.

In an embodiment, when the target frequency domain resource includes M types of frequency domain resources, the resource location indication information includes M location indication information, and the M location indication information sequentially indicates a location of the M types of frequency domain resources in the system frequency domain resource, the resource type indication information includes M type indication information, the M type indication information sequentially indicates resource types of the M frequency domain resources, where M is an integer greater than or equal to 1. It should be understood that, when the target frequency domain resource includes the M types of frequency domain resources, the above resource type indication information may also be composed of only one piece of indication information, and then the resource type information indicates, by only one piece of indication information, the types of the M types of frequency domain resources.

Figure 8:
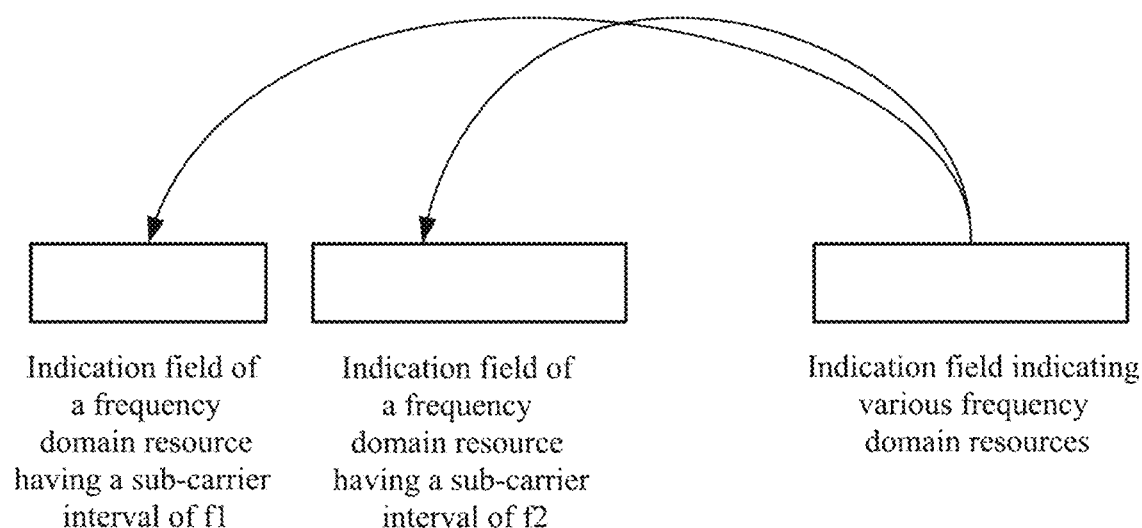
FIG. 8 is a schematic flowchart of a method for indicating a frequency domain resource according to an embodiment of the present application.

For example, as shown in FIG. 8, when the network device allocates a frequency domain resource having sub-carrier intervals of f1 and f2, respectively, to the terminal device, the above resource type information may be composed of only one indication field, and then the indication field indicates the types of these two types of frequency domain resources at the same time. In addition, the above resource type information may also be composed of two fields, which respectively indicate the resource types of the frequency domain resources having the sub-carrier intervals of f1 and f2.

The method for indicating the frequency domain resource in the embodiments of the present application is described in detail from the perspective of the network device with reference to FIG. 3 to FIG. 8, and the method for indicating the frequency domain resource in the embodiments of the present application will be described in detail from the perspective of the terminal device with reference to FIG. 9 and FIG. 10. It should be understood that the steps of the method described in FIG. 9 and FIG. 10 correspond to the steps of the method described in FIG. 3 to FIG. 8, and the duplicated description is appropriately omitted for brevity.

Figure 9:
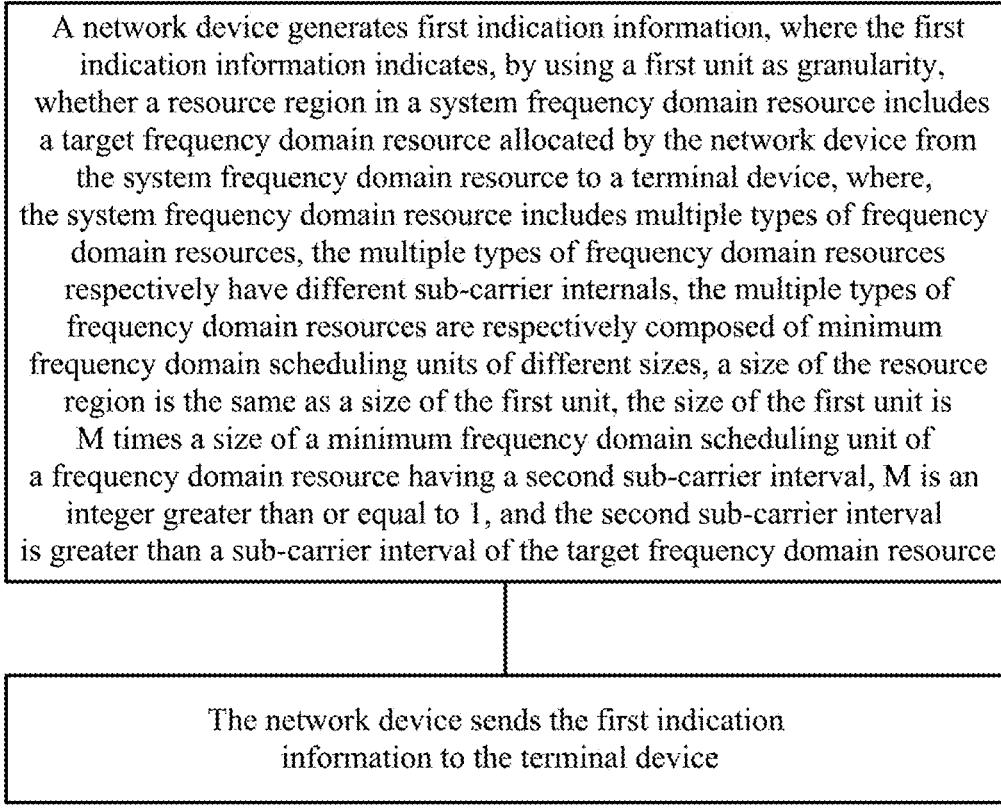
FIG. 9 is a schematic flowchart of a method for indicating a frequency domain resource according to an embodiment of the present application.

FIG. 9 is a schematic flowchart of a method for indicating a frequency domain resource according to an embodiment of the present application. The method of FIG. 9 includes:

910. A network device generates first indication information, where the first indication information indicates, by using a first unit as granularity, whether a resource region in a system frequency domain resource includes a target frequency domain resource allocated by the network device from the system frequency domain resource to a terminal device, where the system frequency domain resource includes multiple types of frequency domain resources, the multiple types of frequency domain resources respectively have different sub-carrier internals, the multiple types of frequency domain resources are respectively composed of minimum frequency domain scheduling units of different sizes, a size of the resource region is the same as a size of the first unit, the size of the first unit is M times a size of a minimum frequency domain scheduling unit of a frequency domain resource having a second sub-carrier interval, M is an integer greater than or equal to 1, and the second sub-carrier interval is greater than a sub-carrier interval of the target frequency domain resource; and 920. The network device sends the first indication information to the terminal device.

In the embodiment of the present application, a size of an indication unit used by the first indication information, that is, the size of the first unit, is greater than a size of a minimum frequency domain scheduling unit of the target frequency domain resource, and a size of an indication unit used for indicating the frequency domain resource in the prior art is the same as that of the minimum frequency domain scheduling unit of the frequency domain resource. Therefore, compared with the prior art, the embodiment of the present application can save signaling overheads.

As an embodiment, the resource region includes the target frequency domain resource, and the method further includes: the network device sends second indication information to the terminal device, where the second indication information indicates, by using a second unit as granularity, whether a frequency domain resource in each of sub-regions of the resource region belongs to the target frequency domain resource, a size of the sub-regions is the same as a size of the second unit, and the size of the second unit is the same as a size of a minimum frequency domain scheduling unit of the target frequency domain resource.

As an embodiment, the first indication information and the second indication information are bitmap information.

As an embodiment, the resource region includes a plurality of sub-regions, and the second indication information includes a plurality of bits, each bit of the plurality of bits corresponds to one sub-region of the plurality of sub-regions, when a first bit in the second indication information is a first value, a frequency domain resource included in a sub-region corresponding to the first bit belongs to the target frequency domain resource, where the first bit is any one of the plurality of bits.

As an embodiment, the target frequency domain resource includes a first frequency domain resource and a second frequency domain resource, and a sub-carrier interval of the first frequency domain resource is smaller than a sub-carrier interval of the second frequency domain resource, the first indication information is configured to indicate, by the first unit, whether the resource region in the system frequency domain resource includes the first frequency domain resource and the second frequency domain resource, and the second sub-carrier interval is greater than or equal to the sub-carrier interval of the second frequency domain resource.

As an embodiment, the resource region includes the first frequency domain resource or the second frequency domain resource, and the method further includes: the network device sends second indication information to the terminal device, where the second indication information indicates, by using a second unit as granularity, whether a frequency domain resource in each of sub-regions of the resource region belongs to the first frequency domain resource or the second frequency domain resource, a size of the sub-regions is the same as a size of the second unit, and the size of the second unit is the same as a size of a minimum frequency domain scheduling unit of the first frequency domain resource.

As an embodiment, the first indication information and the second indication information are bitmap information.

As an embodiment, when all bits in the second indication information are of a second value, frequency domain resources in all the sub-regions of the resource region belong to the second frequency domain resource; when not all the bits in the second indication information are of the second value, the frequency domain resource in at least one sub-region of the resource region belongs to the first frequency domain resource.

As an embodiment, the second value is 0.

As an embodiment, the method further includes: the network device sends resource type information to the terminal device, where the resource type information is configured to indicate a type of a frequency domain resource included in the target frequency domain resource.

Figure 10:
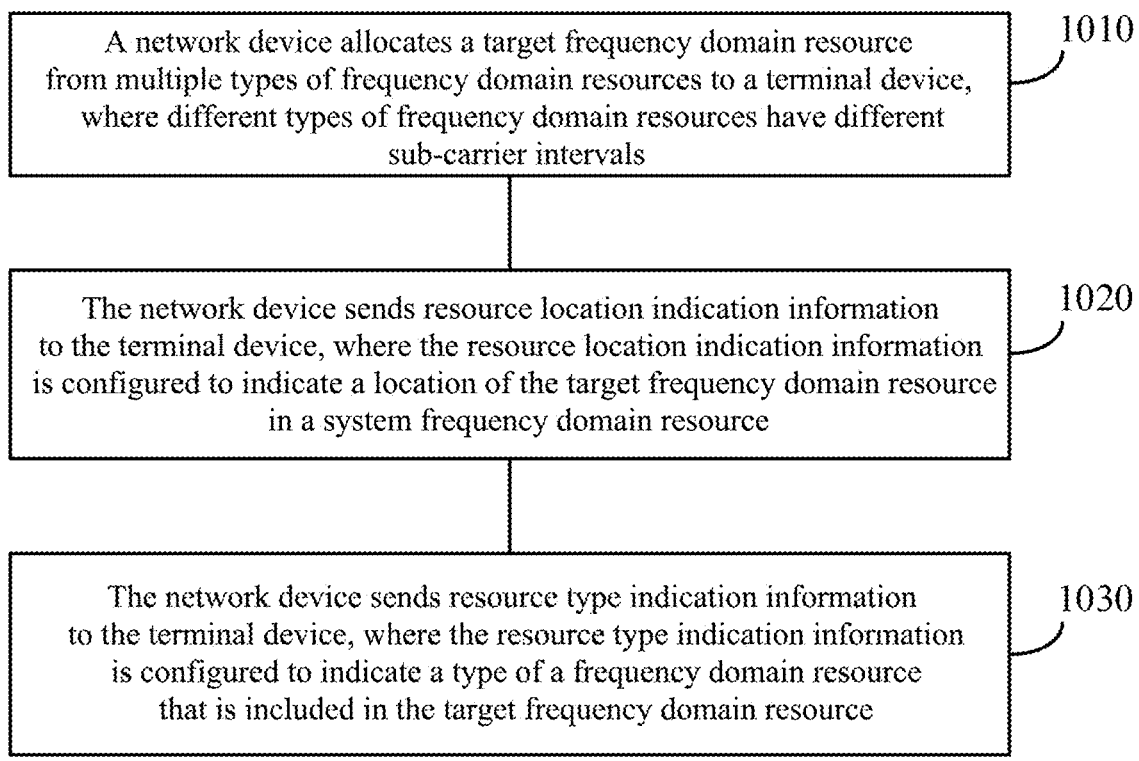
FIG. 10 is a schematic flowchart of a method for indicating a frequency domain resource according to an embodiment of the present application.

FIG. 10 is a schematic flowchart of a method for indicating a frequency domain resource according to an embodiment of the present application. The method of FIG. 10 includes:

1010. A network device allocates a target frequency domain resource from multiple types of frequency domain resources to a terminal device, where different types of frequency domain resources have different sub-carrier intervals;

1020. The network device sends resource location indication information to the terminal device, where the resource location indication information is configured to indicate a location of the target frequency domain resource in a system frequency domain resource; and 1030. The network device sends resource type indication information to the terminal device, where the resource type indication information is configured to indicate a type of a frequency domain resource that is included in the target frequency domain resource.

In the embodiment of the present application, the network device can indicate the resource type of the frequency domain resource allocated to the terminal device by the resource type indication information, which can implement the indication of frequency domain resources having multiple types of sub-carrier intervals.

As an embodiment, the target frequency domain resource includes M types of frequency domain resources, the resource location indication information includes M location indication information, and the M location indication information sequentially indicates a location of the M types of frequency domain resources in the system frequency domain resource, the resource type indication information includes M type indication information, the M type indication information sequentially indicates resource types of the M frequency domain resources, where M is an integer greater than or equal to 1.

The method for indicating the frequency domain resource in the embodiments of the present application is described in detail with reference to FIG. 1 to FIG. 10. The terminal device and the network device in the embodiments of the present application will be described in detail below with reference to FIG. 11 to FIG. 18. It should be understood that the terminal device and the network device in FIG. 11 to FIG. 18 can implement above various steps performed by the terminal device and the network device, which will not be described in details herein to avoid repetition.

Figure 11:
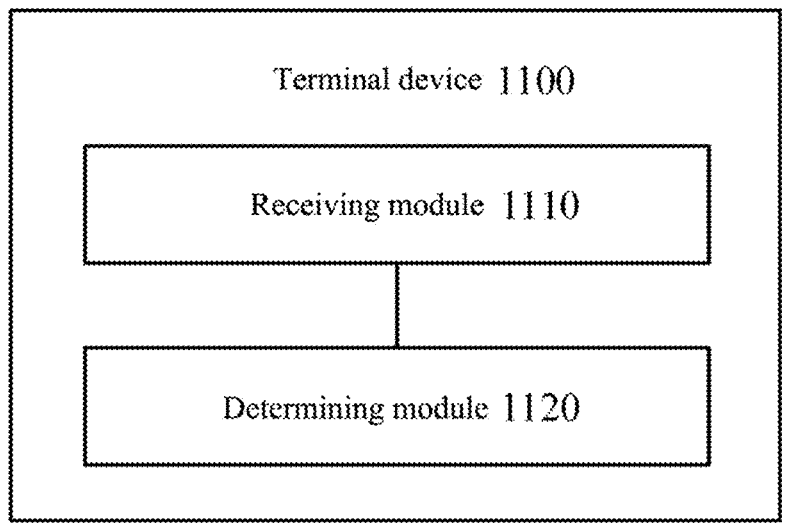
FIG. 11 is a schematic block diagram of a terminal device according to an embodiment of the present application.

FIG. 11 is a schematic block diagram of a terminal device according to an embodiment of the present application. The terminal device 1100 of FIG. 11 includes:

a receiving module 1110, configured to receive first indication information sent by a network device, where the first indication information indicates, by using a first unit as granularity, whether a resource region in a system frequency domain resource includes a target frequency domain resource allocated by the network device from the system frequency domain resource to the terminal device, where, the system frequency domain resource includes multiple types of frequency domain resources, the multiple types of frequency domain resources respectively have different sub-carrier internals, the multiple types of frequency domain resources are respectively composed of minimum frequency domain scheduling units of different sizes, a size of the resource region is the same as a size of the first unit, the size of the first unit is M times a size of a minimum frequency domain scheduling unit of a frequency domain resource having a second sub-carrier interval, M is an integer greater than or equal to 1, and the second sub-carrier interval is greater than a sub-carrier interval of the target frequency domain resource; and a determining module 1120, configured to determine, according to the first indication information, a resource region where the target frequency domain resource is located.

As an embodiment, the resource region includes the target frequency domain resource, and the receiving module 1110 is further configured to: receive second indication information sent by the network device, where the second indication information indicates, by using a second unit as granularity, whether a frequency domain resource in each of sub-regions of the resource region belongs to the target frequency domain resource, a size of the sub-regions is the same as a size of the second unit, and the size of the second unit is the same as a size of a minimum frequency domain scheduling unit of the target frequency domain resource.

As an embodiment, the first indication information and the second indication information are bitmap information.

As an embodiment, the resource region includes a plurality of sub-regions, the second indication information includes a plurality of bits, and each bit of the plurality of bits corresponds to one sub-region of the plurality of sub-regions, when a first bit in the second indication information is a first value, a frequency domain resource included in a sub-region corresponding to the first bit belongs to the target frequency domain resource, where the first bit is any one of the plurality of bits.

As an embodiment, the target frequency domain resource includes a first frequency domain resource and a second frequency domain resource, and a sub-carrier interval of the first frequency domain resource is smaller than a sub-carrier interval of the second frequency domain resource, the first indication information is configured to indicate, by the first unit, whether the resource region in the system frequency domain resource includes the first frequency domain resource and the second frequency domain resource, and the second sub-carrier interval is greater than or equal to the sub-carrier interval of the second frequency domain resource.

As an embodiment, the resource region includes the first frequency domain resource or the second frequency domain resource, and the receiving module 1110 is further configured to: receive second indication information sent by the network device, where the second indication information indicates, by using a second unit as granularity, whether a frequency domain resource in each of sub-regions of the resource region belongs to the first frequency domain resource or the second frequency domain resource, a size of the sub-regions is the same as a size of the second unit, and the size of the second unit is the same as a size of a minimum frequency domain scheduling unit of the first frequency domain resource.

As an embodiment, the first indication information and the second indication information are bitmap information.

As an embodiment, where when all bits in the second indication information are of a second value, frequency domain resources in all the sub-regions of the resource region belong to the second frequency domain resource; when not all the bits in the second indication information are of the second value, a frequency domain resource in at least one sub-region of the resource region belongs to the first frequency domain resource.

As an embodiment, the second value is 0.

As an embodiment, the receiving module 1110 is further configured to: receive resource type information sent by the network device, and the determining module 1120 is further configured to determine, according to the resource type information, a type of a frequency domain resource included in the target frequency domain resource.

Figure 12:
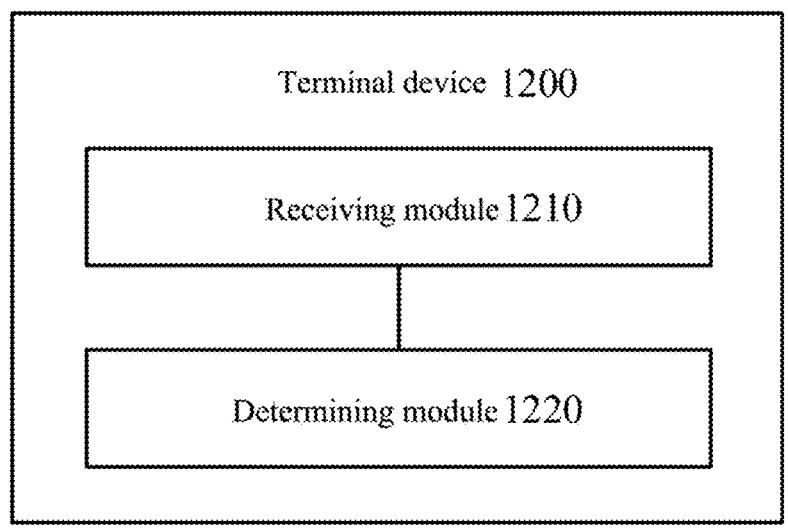
FIG. 12 is a schematic block diagram of a terminal device according to an embodiment of the present application.

FIG. 12 is a schematic block diagram of a terminal device according to an embodiment of the present application. The terminal device 1200 of FIG. 12 includes:

a receiving module 1210, configured to receive resource location indication information sent by a network device;

the receiving module is further configured to receive resource type indication information sent by the terminal device; and a determining module 1220, configured to determine, according to the resource location indication information, a location of a target frequency domain resource in a system frequency domain resource, where the target frequency domain resource is a frequency domain resource allocated by the network device from multiple types of frequency domain resources to the terminal device, and different types of frequency domain resources have different sub-carrier intervals;

the determining module 1220 is further configured to determine, according to the resource type indication information, a type of a frequency domain resource included in the target frequency domain resource.

As an embodiment, the target frequency domain resource includes M types of frequency domain resources, the resource location indication information includes M location indication information, and the M location indication information sequentially indicates a location of the M types of frequency domain resources in the system frequency domain resource, the resource type indication information includes M type indication information, the M type indication information sequentially indicates resource types of the M frequency domain resources, where M is an integer greater than or equal to 1.

Figure 13:
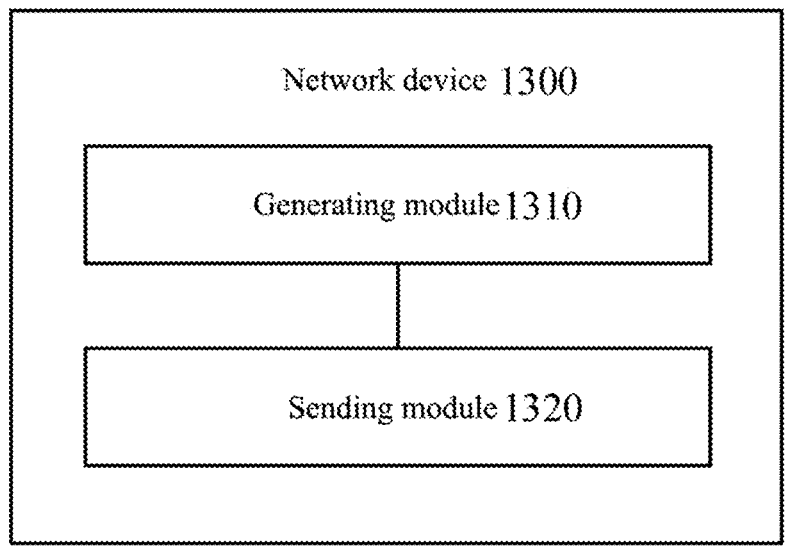
FIG. 13 is a schematic block diagram of a network device according to an embodiment of the present application.

FIG. 13 is a schematic block diagram of a network device according to an embodiment of the present application. The network device 1300 of FIG. 13 includes:

a generating module 1310, configured to generate first indication information, where the first indication information indicates, by using a first unit as granularity, whether a resource region in a system frequency domain resource includes a target frequency domain resource allocated by the network device from the system frequency domain resource to a terminal device, where, the system frequency domain resource includes multiple types of frequency domain resources, the multiple types of frequency domain resources respectively have different sub-carrier internals, the multiple types of frequency domain resources are respectively composed of minimum frequency domain scheduling units of different sizes, a size of the resource region is the same as a size of the first unit, the size of the first unit is M times a size of a minimum frequency domain scheduling unit of a frequency domain resource having a second sub-carrier interval, M is an integer greater than or equal to 1, and the second sub-carrier interval is greater than a sub-carrier interval of the target frequency domain resource; and a sending module 1320, configured to send the first indication information to the terminal device.

As an embodiment, the resource region includes the target frequency domain resource, and the sending module 1320 is further configured to: send second indication information to the terminal device, where the second indication information indicates, by using a second unit as granularity, whether a frequency domain resource in each of sub-regions of the resource region belongs to the target frequency domain resource, a size of the sub-regions is the same as a size of the second unit, and the size of the second unit is the same as a size of a minimum frequency domain scheduling unit of the target frequency domain resource.

As an embodiment, the first indication information and the second indication information are bitmap information.

As an embodiment, the resource region includes a plurality of sub-regions, and the second indication information includes a plurality of bits, each bit of the plurality of bits corresponds to one sub-region of the plurality of sub-regions, when a first bit in the second indication information is a first value, a frequency domain resource included in a sub-region corresponding to the first bit belongs to the target frequency domain resource, where the first bit is any one of the plurality of bits.

As an embodiment, the target frequency domain resource includes a first frequency domain resource and a second frequency domain resource, and a sub-carrier interval of the first frequency domain resource is smaller than a sub-carrier interval of the second frequency domain resource, the first indication information is configured to indicate, by the first unit, whether the resource region in the system frequency domain resource includes the first frequency domain resource and the second frequency domain resource, and the second sub-carrier interval is greater than or equal to the sub-carrier interval of the second frequency domain resource.

As an embodiment, the sending module 1320 is further configured to: send second indication information to the terminal device, where the second indication information indicates, by using a second unit as granularity, whether a frequency domain resource in each of sub-regions of the resource region belongs to the first frequency domain resource or the second frequency domain resource, a size of the sub-regions is the same as a size of the second unit, and the size of the second unit is the same as a size of a minimum frequency domain scheduling unit of the first frequency domain resource.

As an embodiment, the first indication information and the second indication information are bitmap information.

As an embodiment, when all bits in the second indication information are of a second value, frequency domain resources in all the sub-regions of the resource region belong to the second frequency domain resource; when not all the bits in the second indication information are of the second value, the frequency domain resource in at least one sub-region of the resource region belongs to the first frequency domain resource.

As an embodiment, the second value is 0.

As an embodiment, the sending module 1320 is further configured to: send resource type information to the terminal device, where the resource type information is configured to indicate a type of a frequency domain resource included in the target frequency domain resource.

Figure 14:
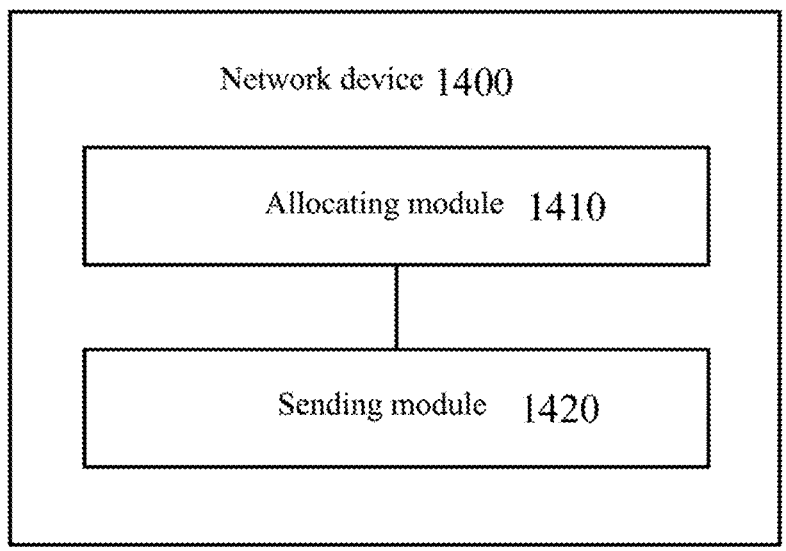
FIG. 14 is a schematic block diagram of a network device according to an embodiment of the present application.

FIG. 14 is a schematic block diagram of a network device according to an embodiment of the present application. The network device 1400 of FIG. 14 includes:

an allocating module 1410, configured to allocate a target frequency domain resource from multiple types of frequency domain resources to a terminal device, where different types of frequency domain resources have different sub-carrier intervals; and a sending module 1420, configured to send resource location indication information to the terminal device, where the resource location indication information is configured to indicate a location of the target frequency domain resource in a system frequency domain resource;

the sending module 1420 is further configured to send resource type indication information to the terminal device, where the resource type indication information is configured to indicate a type of a frequency domain resource that is included in the target frequency domain resource.

As an embodiment, the target frequency domain resource includes M types of frequency domain resources, the resource location indication information includes M location indication information, and the M location indication information sequentially indicates a location of the M types of frequency domain resources in the system frequency domain resource, the resource type indication information includes M type indication information, the M type indication information sequentially indicates resource types of the M frequency domain resources, where M is an integer greater than or equal to 1.

Figure 15:
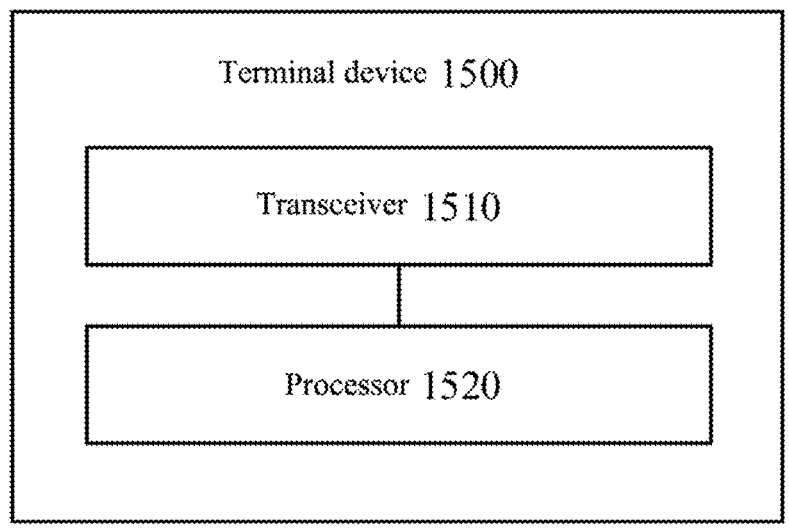
FIG. 15 is a schematic block diagram of a terminal device according to an embodiment of the present application.

FIG. 15 is a schematic block diagram of a terminal device according to an embodiment of the present application. The terminal device 1500 of FIG. 15 includes:

a transceiver 1510, configured to first indication information sent by a network device, where the first indication information indicates, by using a first unit as granularity, whether a resource region in a system frequency domain resource includes a target frequency domain resource allocated by the network device from the system frequency domain resource to the terminal device, where, the system frequency domain resource includes multiple types of frequency domain resources, the multiple types of frequency domain resources respectively have different sub-carrier internals, the multiple types of frequency domain resources are respectively composed of minimum frequency domain scheduling units of different sizes, a size of the resource region is the same as a size of the first unit, the size of the first unit is M times a minimum frequency domain scheduling unit of a frequency domain resource having a second sub-carrier interval, M is an integer greater than or equal to 1, and the second sub-carrier interval is greater than a sub-carrier interval of the target frequency domain resource; and a processor 1520, configured to determine, according to the first indication information, a resource region where the target frequency domain resource is located.

As an embodiment, the resource region includes the target frequency domain resource, and the transceiver 1510 is further configured to: receive second indication information sent by the network device, where the second indication information indicates, by using a second unit as granularity, whether a frequency domain resource in each of sub-regions of the resource region belongs to the target frequency domain resource, a size of the sub-regions is the same as a size of the second unit, and the size of the second unit is the same as a size of a minimum frequency domain scheduling unit of the target frequency domain resource.

As an embodiment, the first indication information and the second indication information are bitmap information.

As an embodiment, the resource region includes a plurality of sub-regions, the second indication information includes a plurality of bits, and each bit of the plurality of bits corresponds to one sub-region of the plurality of sub-regions, when a first bit in the second indication information is a first value, a frequency domain resource included in a sub-region corresponding to the first bit belongs to the target frequency domain resource, where the first bit is any one of the plurality of bits.

As an embodiment, the target frequency domain resource includes a first frequency domain resource and a second frequency domain resource, and a sub-carrier interval of the first frequency domain resource is smaller than a sub-carrier interval of the second frequency domain resource, the first indication information is configured to indicate, by the first unit, whether the resource region in the system frequency domain resource includes the first frequency domain resource and the second frequency domain resource, and the second sub-carrier interval is greater than or equal to the sub-carrier interval of the second frequency domain resource.

As an embodiment, the resource region includes the first frequency domain resource or the second frequency domain resource, and the transceiver 1510 is further configured to: receive second indication information sent by the network device, where the second indication information indicates, by using a second unit as granularity, whether a frequency domain resource in each of sub-regions of the resource region belongs to the first frequency domain resource or the second frequency domain resource, a size of the sub-regions is the same as a size of the second unit, and the size of the second unit is the same as a size of a minimum frequency domain scheduling unit of the first frequency domain resource.

As an embodiment, the first indication information and the second indication information are bitmap information.

As an embodiment, when all bits in the second indication information are of a second value, frequency domain resources in all the sub-regions of the resource region belong to the second frequency domain resource; when not all the bits in the second indication information are of the second value, a frequency domain resource in at least one sub-region of the resource region belongs to the first frequency domain resource.

As an embodiment, the second value is 0.

As an embodiment, the transceiver 1510 is further configured to: receive resource type information sent by the network device, and the processor 1520 is further configured to determine, according to the resource type information, a type of a frequency domain resource included in the target frequency domain resource.

Figure 16:
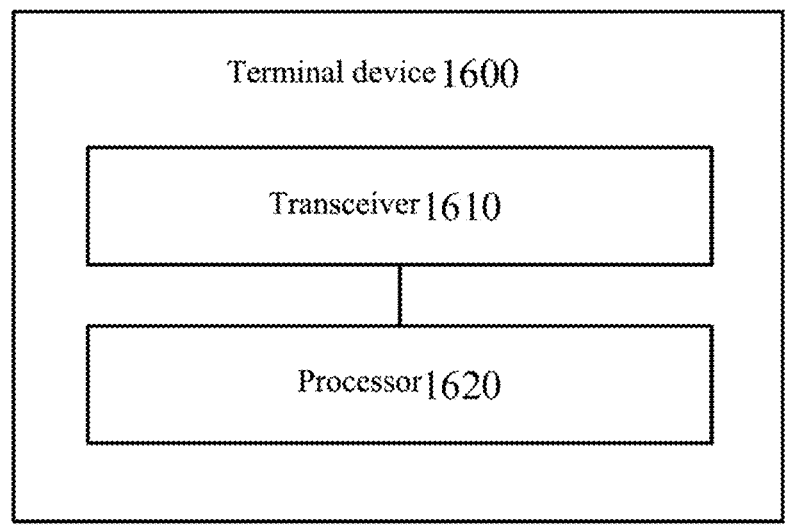
FIG. 16 is a schematic block diagram of a terminal device according to an embodiment of the present application.

FIG. 16 is a schematic block diagram of a terminal device according to an embodiment of the present application. The terminal device 1600 of FIG. 16 includes:

a transceiver 1610, configured to receive resource location indication information sent by a network device;

the transceiver 1610 is further configured to receive resource type indication information sent by the terminal device; and a processor 1620, configured to determine, according to the resource location indication information, a location of a target frequency domain resource in a system frequency domain resource, where the target frequency domain resource is a frequency domain resource allocated by the network device from multiple types of frequency domain resources to the terminal device, and different types of frequency domain resources have different sub-carrier intervals;

the processor 1620 is further configured to determine, according to the resource type indication information, a type of a frequency domain resource included in the target frequency domain resource.

As an embodiment, the target frequency domain resource includes M types of frequency domain resources, the resource location indication information includes M location indication information, and the M location indication information sequentially indicates a location of the M types of frequency domain resources in the system frequency domain resource, the resource type indication information includes M type indication information, the M type indication information sequentially indicates resource types of the M frequency domain resources, where M is an integer greater than or equal to 1.

Figure 17:
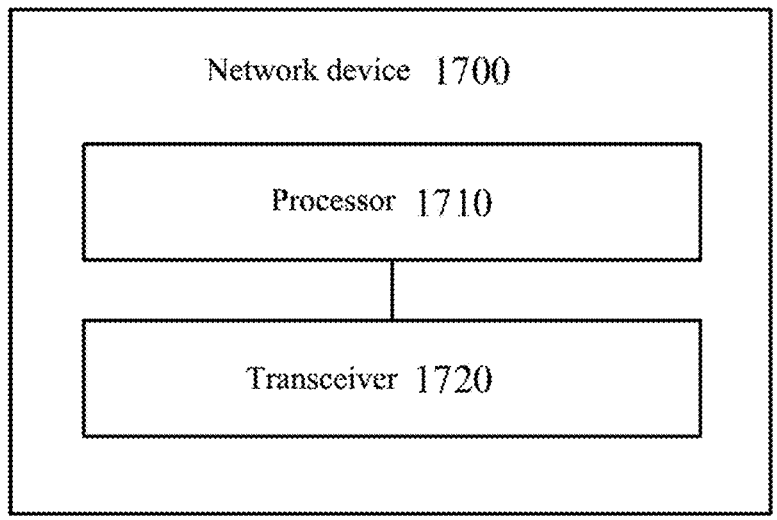
FIG. 17 is a schematic block diagram of a network device according to an embodiment of the present application.

FIG. 17 is a schematic block diagram of a network device according to an embodiment of the present application. The network device 1700 of FIG. 17 includes:

a processor 1710, configured to generate first indication information, where the first indication information indicates, by using a first unit as granularity, whether a resource region in a system frequency domain resource includes a target frequency domain resource allocated by the network device from the system frequency domain resource to a terminal device, where, the system frequency domain resource includes multiple types of frequency domain resources, the multiple types of frequency domain resources respectively have different sub-carrier internals, the multiple types of frequency domain resources are respectively composed of minimum frequency domain scheduling units of different sizes, a size of the resource region is the same as a size of the first unit, the size of the first unit is M times a minimum frequency domain scheduling unit of a frequency domain resource having a second sub-carrier interval, M is an integer greater than or equal to 1, and the second sub-carrier interval is greater than a sub-carrier interval of the target frequency domain resource; and a transceiver 1720, configured to send the first indication information to the terminal device.

As an embodiment, the resource region includes the target frequency domain resource, and the transceiver 1720 is further configured to: send second indication information to the terminal device, where the second indication information indicates, by using a second unit as granularity, whether a frequency domain resource in each of sub-regions of the resource region belongs to the target frequency domain resource, a size of the sub-regions is the same as a size of the second unit, and the size of the second unit is the same as a size of a minimum frequency domain scheduling unit of the target frequency domain resource.

As an embodiment, the first indication information and the second indication information are bitmap information.

As an embodiment, the resource region includes a plurality of sub-regions, and the second indication information includes a plurality of bits, each bit of the plurality of bits corresponds to one sub-region of the plurality of sub-regions, when a first bit in the second indication information is a first value, a frequency domain resource included in a sub-region corresponding to the first bit belongs to the target frequency domain resource, where the first bit is any one of the plurality of bits.

As an embodiment, the target frequency domain resource includes a first frequency domain resource and a second frequency domain resource, and a sub-carrier interval of the first frequency domain resource is smaller than a sub-carrier interval of the second frequency domain resource, the first indication information is configured to indicate, by the first unit, whether the resource region in the system frequency domain resource includes the first frequency domain resource and the second frequency domain resource, and the second sub-carrier interval is greater than or equal to the sub-carrier interval of the second frequency domain resource.

As an embodiment, the transceiver 1720 is further configured to: send second indication information to the terminal device, where the second indication information indicates, by using a second unit as granularity, whether a frequency domain resource in each of sub-regions of the resource region belongs to the first frequency domain resource or the second frequency domain resource, a size of the sub-regions is the same as a size of the second unit, and the size of the second unit is the same as a size of a minimum frequency domain scheduling unit of the first frequency domain resource.

As an embodiment, the first indication information and the second indication information are bitmap information.

As an embodiment, when all bits in the second indication information are of a second value, frequency domain resources in all the sub-regions of the resource region belong to the second frequency domain resource; when not all the bits in the second indication information are of the second value, the frequency domain resource in at least one sub-region of the resource region belongs to the first frequency domain resource.

As an embodiment, the second value is 0.

As an embodiment, the transceiver 1720 is further configured to: send resource type information to the terminal device, where the resource type information is configured to indicate a type of a frequency domain resource included in the target frequency domain resource.

Figure 18:
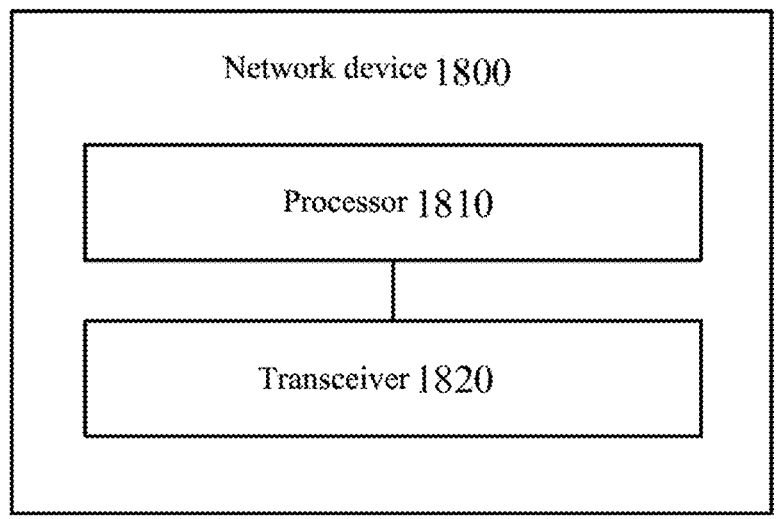
FIG. 18 is a schematic block diagram of a network device according to an embodiment of the present application.

FIG. 18 is a schematic block diagram of a network device according to an embodiment of the present application. The network device 1800 of FIG. 18 includes:

a processor 1810, configured to allocate a target frequency domain resource from multiple types of frequency domain resources to a terminal device, where different types of frequency domain resources have different sub-carrier intervals; and a transceiver 1820, configured to send resource location indication information to the terminal device, where the resource location indication information is configured to indicate a location of the target frequency domain resource in a system frequency domain resource;

the transceiver 1820 is further configured to send resource type indication information to the terminal device, where the resource type indication information is configured to indicate a type of a frequency domain resource that is included in the target frequency domain resource.

As an embodiment, the target frequency domain resource includes M types of frequency domain resources, the resource location indication information includes M location indication information, and the M location indication information sequentially indicates a location of the M types of frequency domain resources in the system frequency domain resource, the resource type indication information includes M type indication information, the M type indication information sequentially indicates resource types of the M frequency domain resources, where M is an integer greater than or equal to 1.

Figure 19:
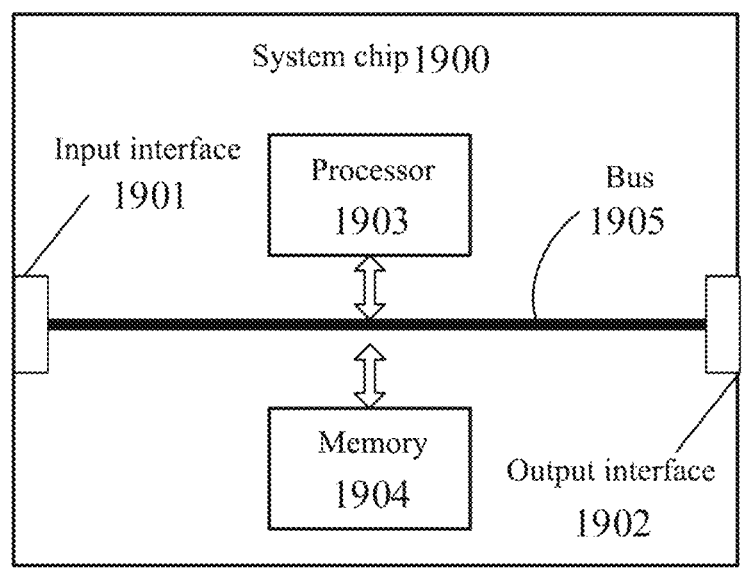
FIG. 19 is a schematic block diagram of a system chip according to an embodiment of the present application.

FIG. 19 is a schematic structural diagram of a system chip according to an embodiment of the present application. The system chip 1900 of FIG. 19 includes an input interface 1901, an output interface 1902, a processor 1903 and a memory 1904, which are connected by a bus 1905, the processor 1903 is configured to execute a code in the memory 1904.

In an embodiment, when the code is executed, the processor 1903 implements a method performed by the terminal device in the method embodiment, which will not be repeated herein for brevity.

In an embodiment, when the code is executed, the processor 1903 implements a method performed by the network device in the method embodiment, which will not be repeated herein for brevity.

Those skilled in the art will appreciate that the elements and algorithm steps of the examples described in conjunction with the embodiments disclosed herein can be implemented in electronic hardware or a combination of computer software and electronic hardware. Whether these functions are performed in hardware or software, it depends on specific applications and design constraints of the technical solution. A person skilled in the art may use different methods to implement the described functions with respect to each particular application, but such implementation should not be considered to go beyond the scope of the present application.

Those skilled in the art can clearly understand that, for convenience and brevity of the description, for specific operation processes of the systems, the apparatuses and the units described above, reference may be made to the corresponding processes in the above method embodiments, and details will not be described herein again.

In the embodiments provided in the present application, it should be understood that the disclosed systems, apparatuses, and methods may be implemented in other manners. For example, the apparatus embodiments described above are merely illustrative. For example, the division of the units is only a logical function division. In an actual implementation, there may be another division manner. For example, multiple units or components may be combined or may be integrated into another system, or some features may be ignored or not executed. In addition, a coupling or direct coupling or communication connection shown or discussed may be an indirect coupling or communication connection through some interfaces, apparatuses or units, and may be electrical, mechanical or otherwise.

The units described as separate components may or may not be physically separated, and the components shown as units may or may not be physical units, that is, may be located in one place, or may be distributed to multiple network units. Some or all of the units may be selected according to actual needs to achieve the purpose of the solutions of the embodiments.

In addition, the functional units in the embodiments of the present application may be integrated into one processing unit, or each of the units may exist alone physically, or two or more units may be integrated in one unit.

The functions may be stored in a computer readable storage medium if implemented in the form of a software functional unit and sold or used as a standalone product. Based on such understanding, the essence of the technical solution of the present application, or a part of the technical solution of the present application contributing to the prior art, or a part of the technical solution may be embodied in the form of a software product which is stored in a storage medium, including instructions for enabling a computer device (which may be a personal computer, a server, or a network device, etc.) to perform all or part of the steps of the embodiments of the present application. The above storage medium includes: various mediums capable of storing program codes, such as a USB flash disk, a mobile hard disk, a read-only memory (ROM), a random access memory (RAM), a magnetic disk, an optical disk, or the like.

The above description is only specific embodiments of the present application, but the protection scope of the present application is not limited thereto. Any modification or the substitution conceived by persons skilled in the art within the technical scope of the present application should be covered in the protection scope of the present application. Therefore, the protection scope of the present application is subject to the protection scope of the appended claims.

What is claimed is:

1. A method for indicating a frequency domain resource, comprising:

receiving, by a terminal device, first indication information sent by a network device, wherein the first indication information indicates, by using a first unit, whether a resource region in a system frequency domain resource comprises a target frequency domain resource allocated by the network device from the system frequency domain resource to the terminal device, wherein, the system frequency domain resource comprises multiple types of frequency domain resources, the multiple types of frequency domain resources have different sub-carrier internals, the multiple types of frequency domain resources are respectively composed of minimum frequency domain scheduling units of different sizes, a size of the resource region is the same as a size of the first unit, the size of the first unit is M times a minimum frequency domain scheduling unit of a frequency domain resource having a second sub-carrier interval, M is an integer greater than or equal to 1, and the second sub-carrier interval is greater than a sub-carrier interval of the target frequency domain resource; and determining, by the terminal device, according to the first indication information, a resource region where the target frequency domain resource is located;

wherein the target frequency domain resource comprises a first frequency domain resource and a second frequency domain resource, and a sub-carrier interval of the first frequency domain resource is smaller than a sub-carrier interval of the second frequency domain resource, the first indication information is configured to indicate, by the first unit, whether the resource region in the system frequency domain resource comprises the first frequency domain resource and the second frequency domain resource, and the second sub-carrier interval is greater than or equal to the sub-carrier interval of the second frequency domain resource;

wherein the resource region comprises the first frequency domain resource or the second frequency domain resource, and the method further comprises:

receiving, by the terminal device, second indication information sent by the network device, wherein the second indication information indicates, by using a second unit, whether a frequency domain resource in each of sub-regions of the resource region belongs to the first frequency domain resource or the second frequency domain resource, a size of the sub-regions is the same as a size of the second unit, and the size of the second unit is the same as a size of a minimum frequency domain scheduling unit of the first frequency domain resource;

wherein the second indication information is bitmap information;

wherein when all bits in the second indication information are of a second value, frequency domain resources in all the sub-regions of the resource region belong to the second frequency domain resource;

when not all the bits in the second indication information are of the second value, a frequency domain resource in at least one sub-region of the resource region belongs to the first frequency domain resource.

2. The method of claim 1, wherein the first indication is bitmap information;
wherein the second value is 0.

3. The method of claim 1, wherein the method further comprises:
receiving, by the terminal device, resource type information sent by the network device; and
determining, by the terminal device, according to the resource type information, a type of a frequency domain resource comprised in the target frequency domain resource.

4. A terminal device, comprising: a transceiver, a memory, a processor, and a computer program stored on the memory and operable on the processor,
wherein the processor, when running the computer program, is configured to:
control the transceiver to receive first indication information sent by a network device, wherein the first indication information indicates, by using a first unit, whether a resource region in a system frequency domain resource comprises a target frequency domain resource allocated by the network device from the system frequency domain resource to the terminal device, wherein,
the system frequency domain resource comprises multiple types of frequency domain resources, the multiple types of frequency domain resources have different sub-carrier internals, the multiple types of frequency domain resources are respectively composed of minimum frequency domain scheduling units of different sizes, a size of the resource region is the same as a size of the first unit, the size of the first unit is M times a size of a minimum frequency domain scheduling unit of a frequency domain resource having a second sub-carrier interval, M is an integer greater than or equal to 1, and the second sub-carrier interval is greater than a sub-carrier interval of the target frequency domain resource; and determine, according to the first indication information, a resource region where the target frequency domain resource is located;

wherein the target frequency domain resource comprises a first frequency domain resource and a second frequency domain resource, and a sub-carrier interval of the first frequency domain resource is smaller than a sub-carrier interval of the second frequency domain resource, the first indication information is configured to indicate, by the first unit, whether the resource region in the system frequency domain resource comprises the first frequency domain resource and the second frequency domain resource, and the second sub-carrier interval is greater than or equal to the sub-carrier interval of the second frequency domain resource;

wherein the resource region comprises the first frequency domain resource or the second frequency domain resource, and the processor is further configured to:

control the transceiver to receive second indication information sent by the network device, wherein the second indication information indicates, by using a second unit, whether a frequency domain resource in each of sub-regions of the resource region belongs to the first frequency domain resource or the second frequency domain resource, a size of the sub-regions is the same as a size of the second unit, and the size of the second unit is the same as a size of a minimum frequency domain scheduling unit of the first frequency domain resource;

wherein the second indication information is bitmap information;

wherein when all bits in the second indication information are of a second value, frequency domain resources in all the sub-regions of the resource region belong to the second frequency domain resource;

when not all the bits in the second indication information are of the second value, a frequency domain resource in at least one sub-region of the resource region belongs to the first frequency domain resource.

5. The terminal device of claim 4, wherein the first indication information bitmap information.

6. The terminal device of claim 4, wherein the second value is 0.

7. The terminal device of claim 4, wherein the processor is further configured to:
control the transceiver to receive resource type information sent by the network device; and
determine, according to the resource type information, a type of a frequency domain resource comprised in the target frequency domain resource.

* * * * *